US010038610B2

United States Patent
Gupta et al.

(10) Patent No.: US 10,038,610 B2
(45) Date of Patent: Jul. 31, 2018

(54) SYSTEM AND METHOD FOR DISTRIBUTING MOBILE DATA

(71) Applicant: ShareG, Inc., San Jose, CA (US)

(72) Inventors: Suruchi Gupta, San Jose, CA (US); Jinesh Doshi, San Jose, CA (US); Jayant Kshirsagar, San Jose, CA (US); Sandeep Gupta, San Jose, CA (US)

(*) Notice: Subject to any disclaimer, the term of this patent is extended or adjusted under 35 U.S.C. 154(b) by 0 days.

(21) Appl. No.: 15/061,889

(22) Filed: Mar. 4, 2016

(65) Prior Publication Data

US 2016/0261473 A1    Sep. 8, 2016

Related U.S. Application Data

(60) Provisional application No. 62/128,490, filed on Mar. 4, 2015.

(51) Int. Cl.

| H04M 11/00 | (2006.01) |
|---|---|
| H04L 12/26 | (2006.01) |
| H04L 29/08 | (2006.01) |
| H04W 60/00 | (2009.01) |
| H04W 4/06 | (2009.01) |
| H04W 4/24 | (2018.01) |
| H04W 12/06 | (2009.01) |

(52) U.S. Cl.
CPC ............ *H04L 43/08* (2013.01); *H04L 67/303* (2013.01); *H04W 4/06* (2013.01); *H04W 4/24* (2013.01); *H04W 60/00* (2013.01); *H04W 12/06* (2013.01)

(58) Field of Classification Search
CPC .......................... H04W 4/24; H04M 2215/32
See application file for complete search history.

(56) References Cited

U.S. PATENT DOCUMENTS

| 6,311,074 | B1 | 10/2001 | Luders |
|---|---|---|---|
| 2006/0014519 | A1* | 1/2006 | Marsh ................ G06Q 10/06 455/406 |
| 2008/0182563 | A1 | 7/2008 | Wugofski et al. |
| 2011/0188507 | A1 | 8/2011 | Watts |
| 2011/0281551 | A1 | 11/2011 | Gonzalez et al. |
| 2013/0316703 | A1 | 11/2013 | Girard et al. |
| 2014/0220927 | A1 | 8/2014 | Girard et al. |

(Continued)

FOREIGN PATENT DOCUMENTS

WO    2001/017182 A1    3/2001

OTHER PUBLICATIONS

International Search Report issued in corresponding International Application No. PCT/US16/21055 dated Jun. 2, 2016.

*Primary Examiner* — Steve D Agosta
(74) *Attorney, Agent, or Firm* — NWAMU, P.C.

(57) ABSTRACT

A global cross-carrier system for distributing mobile data. A sharer utilizes a mobile application to access the data share server to enable sharing of any unused data in the sharer's data plan with a wireless network carrier. A borrower associated with another carrier can utilize a mobile application to access the data share server to enable borrowing of any available data shared by other users. A data share server might optionally purchase data from one or more carriers, the one or more carriers need not be located within the same country. The sharer has an option of purchasing a data plan from the data share server. A borrower has the option of purchasing on-demand data in the form of a session if there are no sharers in the data pool.

18 Claims, 22 Drawing Sheets

(56) References Cited

U.S. PATENT DOCUMENTS

2014/0370848 A1 12/2014 Petcavich
2015/0019307 A1 1/2015 Girard et al.
2015/0249750 A1 9/2015 Kakadia et al.

* cited by examiner

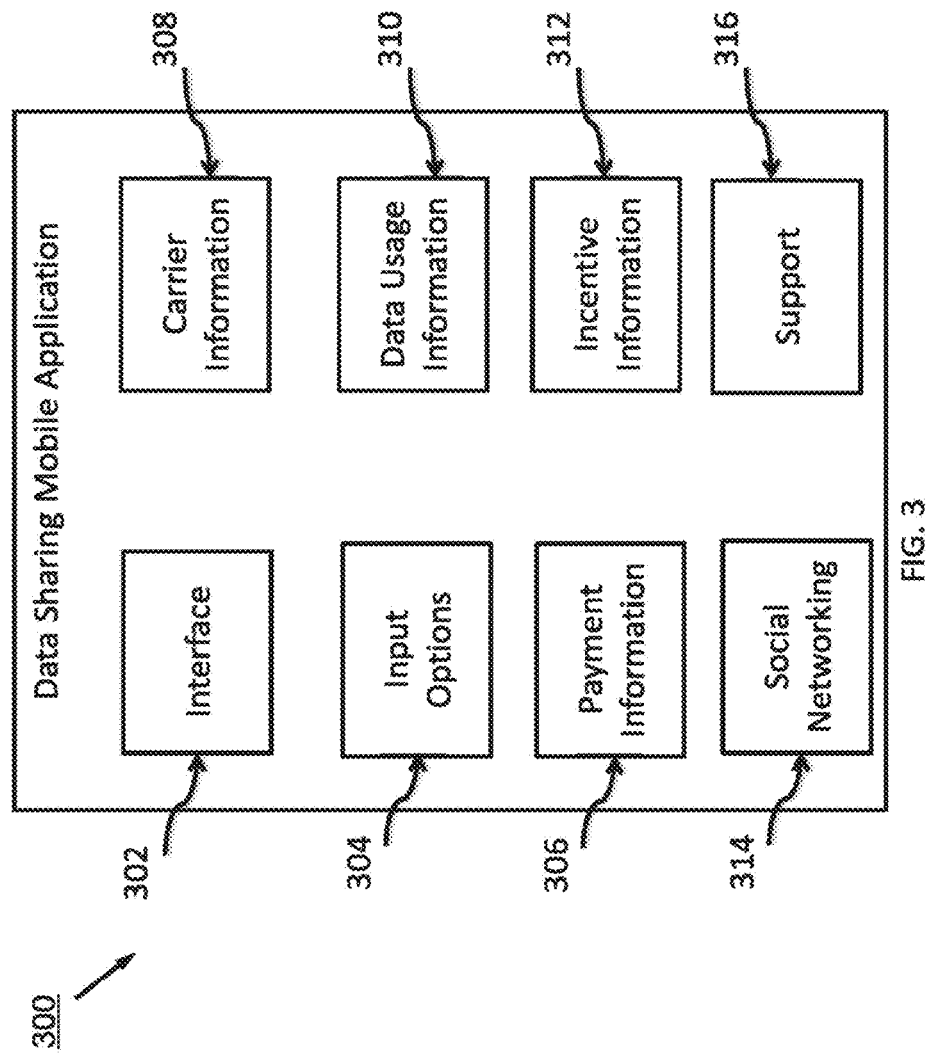

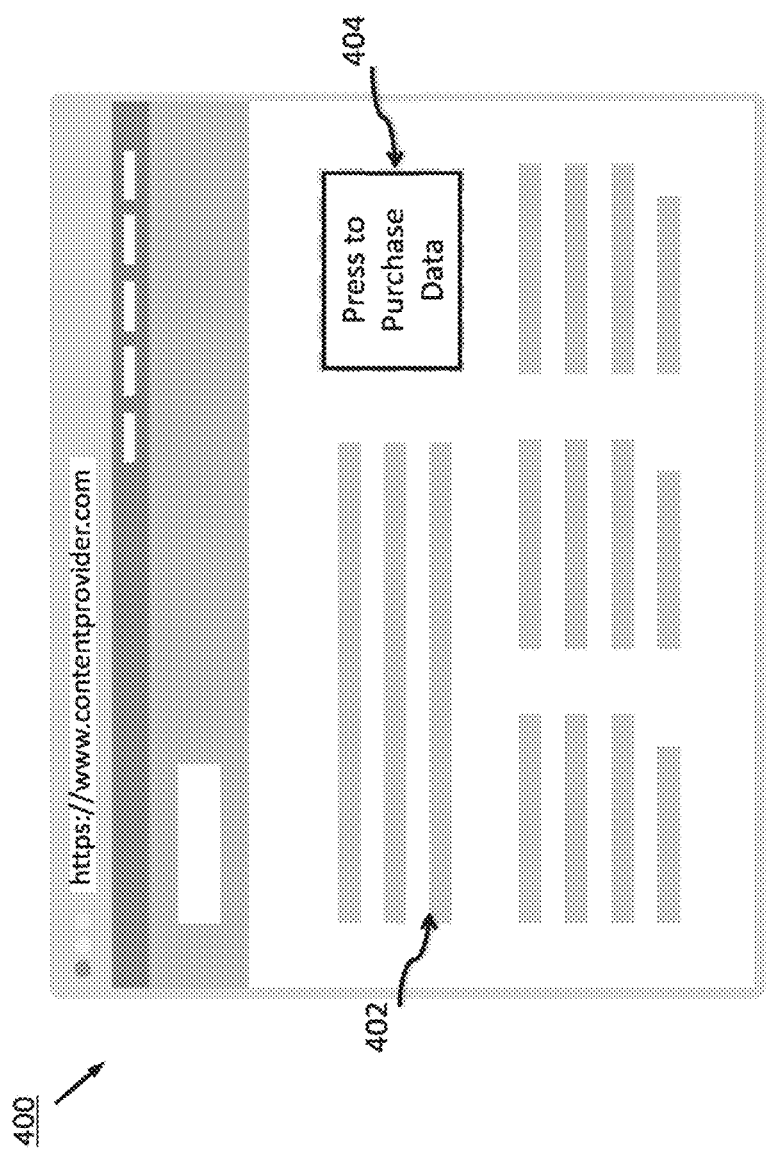

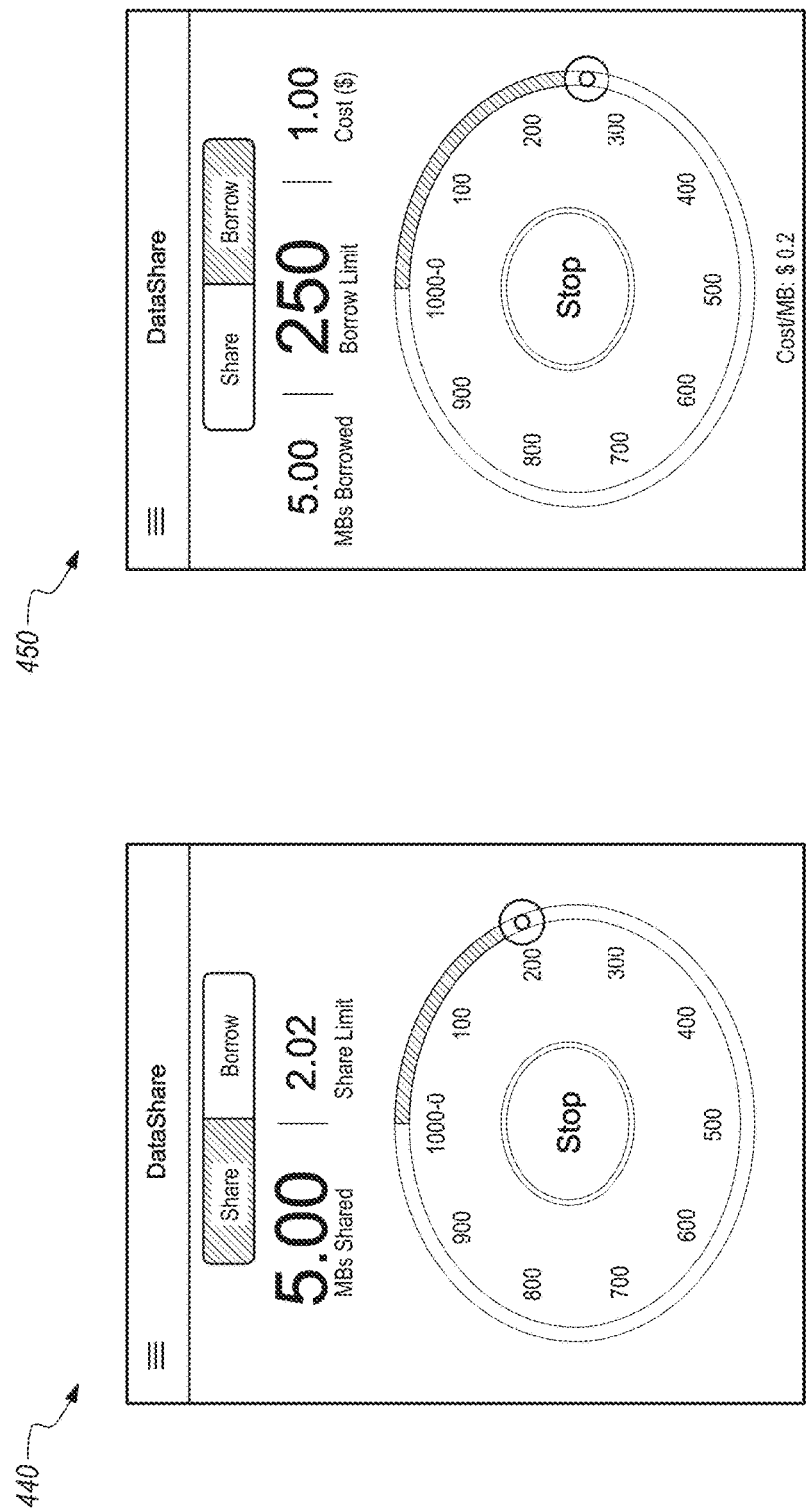

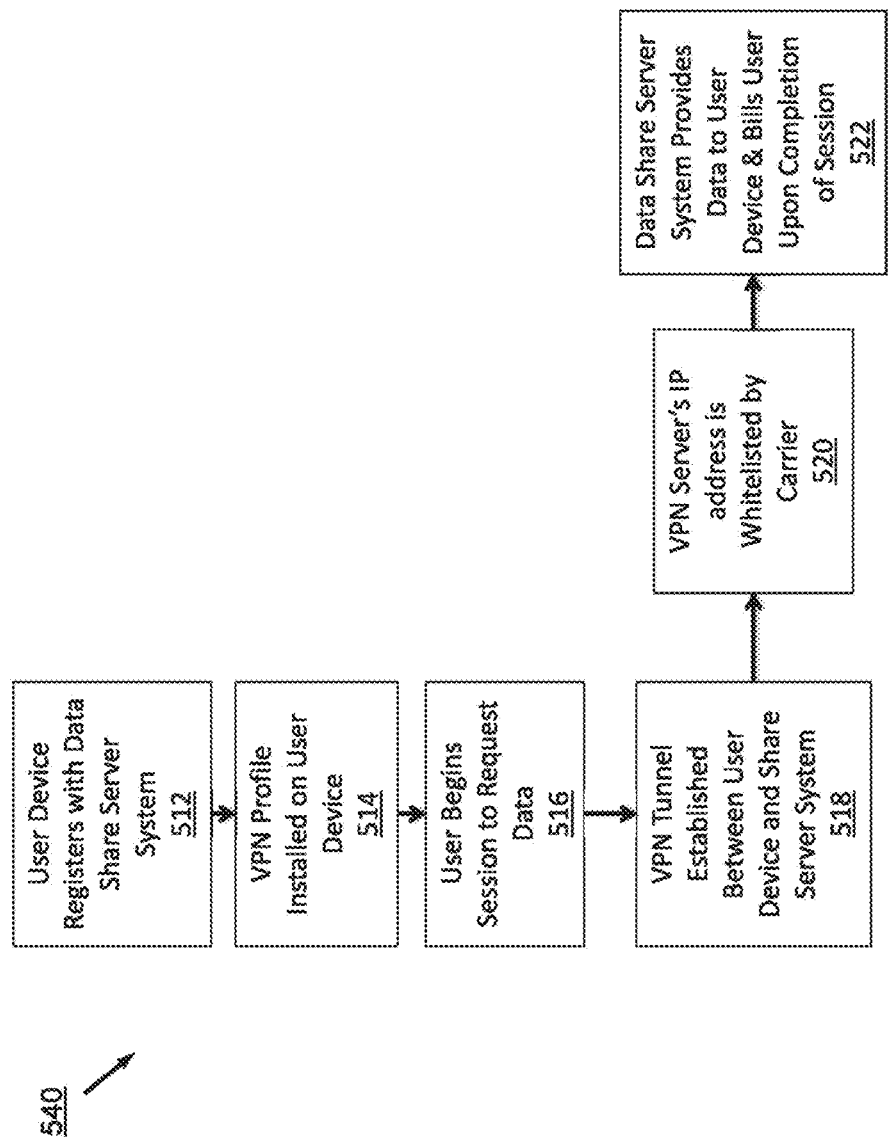

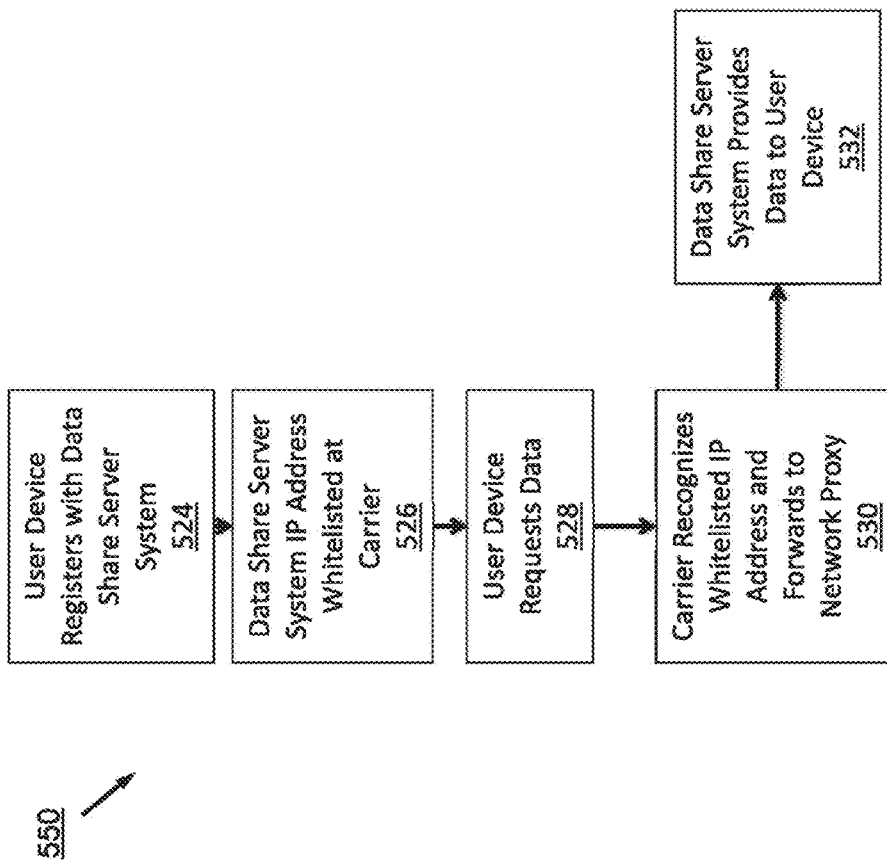

SYSTEM AND METHOD FOR DISTRIBUTING MOBILE DATA

PRIORITY CLAIM

The present application claims priority from U.S. Provisional Application Ser. No. 62/128,490, titled "SYSTEM AND METHOD FOR DISTRIBUTING MOBILE DATA" and filed on Mar. 4, 2015, the contents of which are incorporated herein by reference in their entirety.

BACKGROUND

The present invention relates generally to mobile communication systems and methods and more specifically to mobile communication systems and methods for distributing mobile data.

The use of smartphones and other Internet computing devices has become widespread. In order to benefit from the Internet-enabled computing device, a user typically desires the use of data to access networked resources (e.g., over the Internet).

Data plans cover the service that enables a user to send and receive data on their Internet-enabled devices. A mobile data plan from a cell phone provider or network carrier, for example, allows access to a data network to send and receive emails, surf the Internet, use IM, and so on from any Internet-enabled device.

Unlimited data plans for cell phones (including smartphones) were the norm until recently, sometimes folded in with other wireless services in a one-price subscription plan for voice, data, and texting.

Tiered data plans charge different rates based on how much data a user uses each month. The benefit is that the metered plans discourage heavy data usage that can slow down a cellular network. The downside is that users have to be vigilant about how much data they're using, and for heavy users, tiered data plans are more expensive. Another downside is that users pay for more data than they end up using, and they waste money on the unused data.

It is within the aforementioned context that a need for the present invention has arisen. Thus, there is a need to address one or more of the foregoing disadvantages of conventional systems and methods, and the present invention meets this need.

BRIEF SUMMARY

Various aspects of a data marketplace with global cross-carrier methods and systems for distributing mobile data can be found in exemplary embodiments of the present invention.

In a first embodiment, the method of the present invention uses at least one data share server to create and store in a data store, registration profiles for multiple mobile device accounts. Each mobile device account is previously associated with a wireless network carrier prior to registration. As an example, a first mobile device account that is associated with a first wireless network carrier may be registered. A second mobile device account that is associated with a second (but different) wireless network carrier might also be registered.

Upon the data share server receiving a request from the first mobile device account, communication is established with the first wireless network carrier to receive a first amount of data or network data credits from the first wireless network carrier. Here, the first amount of network data credits is based on network data credits designated to the first mobile device account by the first wireless network carrier.

Upon request from the second mobile device account, communication is established with the second wireless network carrier to receive a second amount of network data credits from the second wireless network carrier. The second amount of network data credits is based on network data credits designated by the second wireless network carrier to the second mobile device account.

Thereafter, the first amount of network data credits is then allocated to the second mobile device account (of the second wireless network carrier) for use. Alternatively, if data is needed by the first mobile device account, the second amount of network data credits may be allocated to the first mobile device account (of the first wireless network carrier) for use. In this manner, among other advantages, the present invention establishes a data marketplace that allows users, sharers and borrowers to utilize a single application interface to share and borrow data across multiple wireless network carriers.

In another embodiment, a data share server purchases data from a carrier or a wholesale reseller or MVNE (mobile network virtual enabler). A sharer utilizes a mobile application to access the data share server to enable sharing of any unused data in the sharer's data plan. A borrower also utilizes a mobile application to access the data share server to enable borrowing of any available data shared by other users. The sharer has an option of purchasing a data plan from the data share server. Unlike conventional systems, users need not be vigilant about how much data they are using; and users need not worry about wasting money on unused data as such unused data can be shared and borrowed.

In another embodiment, a data share server facilitates sharing of data across multiple carriers. A sharer utilizes a mobile application to access the data share server to enable sharing of any unused data in the sharer's data plan. A borrower also utilizes a mobile application to access the data share server to enable borrowing of any available data shared by other users. The sharer has an option of purchasing a data plan from the data share server.

In yet another embodiment, a data share server purchases data from one or multiple carriers. A mobile device user registers with the data share server. The mobile device user accesses a webpage associated with a content provider. The webpage includes a selection area within which the user may request and purchase data from the data share server for use in accessing content on the webpage.

Another advantage of the present invention is that on demand data consumption sessions are enabled without integrating with a carrier's billing system and without installing any additional network equipment. Further yet, a user can share unused data from an existing data plan with other users globally on the same or different carrier's data network and borrow or purchase as little data as they need.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 3 illustrates a data sharing mobile application according to an exemplary embodiment of the present invention.

FIG. 4A illustrates a web interface according to an exemplary embodiment of the present invention.

FIG. 4E illustrates a mobile application interface according to an exemplary embodiment of the present invention.

FIG. 4F illustrates a mobile application interface according to an exemplary embodiment of the present invention.

FIG. 5B illustrates a VPN registration process according to an exemplary embodiment of the present invention.

FIG. 5C illustrates a network proxy registration process according to an exemplary embodiment of the present invention.

DETAILED DESCRIPTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Briefly, among other advantages of the present invention, a data marketplace is established that allows users, sharers and borrowers to utilize a single application interface to share and borrow data across a single or multiple carriers. Quality of network may be monitored and carriers dynamically changed based on quality of service. Thus, a sharer utilizes a mobile application to access the data share server to enable sharing of any unused data in the sharer's data plan. A borrower also utilizes a mobile application to access the data share server to enable borrowing of any available data shared by other users. Any user including the sharer or borrower has an option of purchasing a data plan from the data share server. The data marketplace of the present invention simplifies borrowing and sharing of data and purchasing data on demand. Users need not underutilize data plans that are purchased.

Figure 1A:
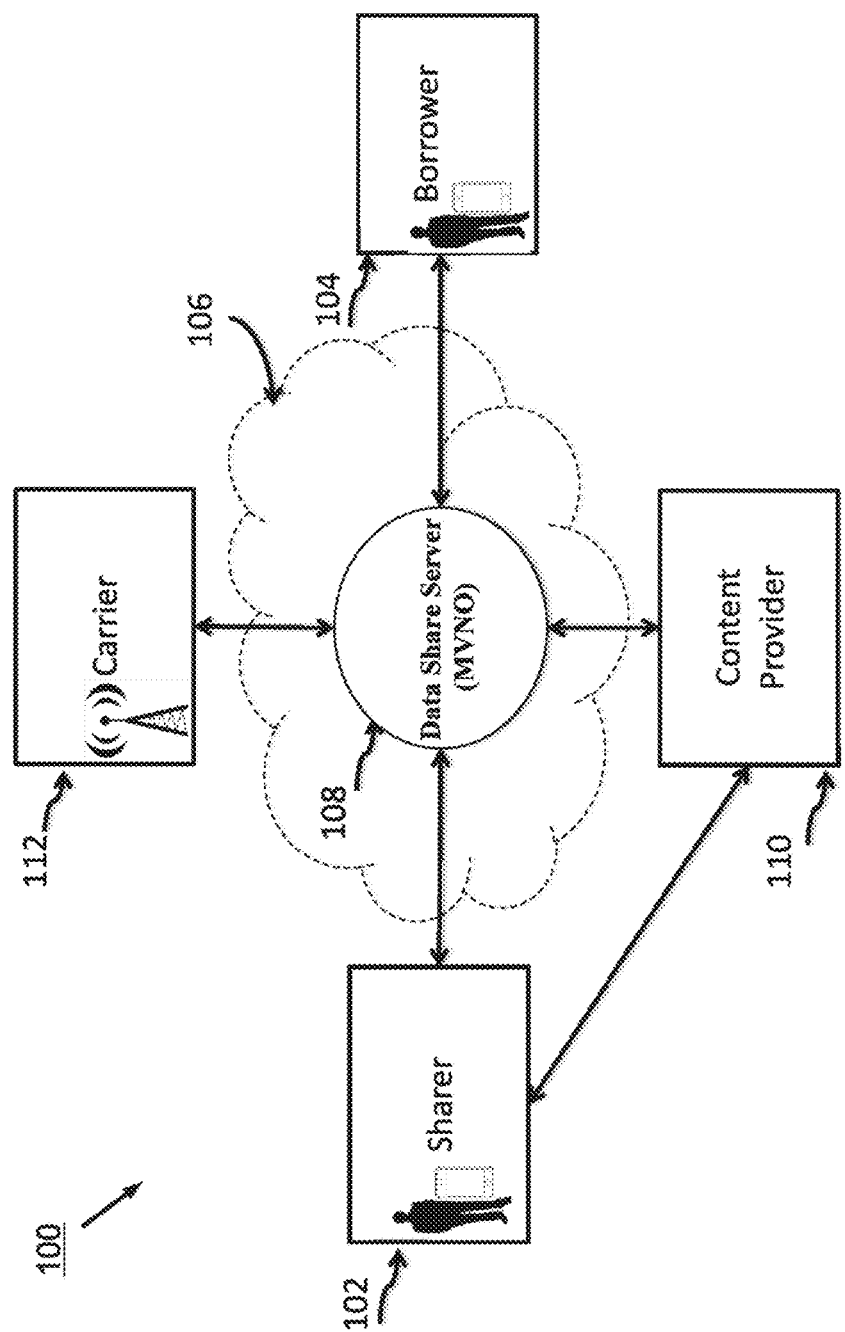
FIG. 1A illustrates a single carrier data marketplace according to an exemplary embodiment of the present invention.

FIG. 1A illustrates a single carrier data marketplace 100 according to an exemplary embodiment of the present invention.

In FIG. 1A, users may utilize single carrier data marketplace 100 as a data marketplace to facilitate data acquisition, data sharing and data borrowing within the network as well as outside the network (e.g. social networks). As discussed below, embodiments of the present invention also extend to services such as dynamically allocating data from a carrier that has better network quality in that particular location.

As shown in FIG. 1A, among other components, data marketplace 100 comprises a data share server 108 communicably coupled via Internet/communication network 106 to a first carrier 112. Internet/communication network 106 can be any communication network that allows data to be communicated or transferred from one point to another. Such a network might be wired or wireless as deemed necessary to be consistent with the spirit and scope of the present invention. In one embodiment, data might refer to wireless network access credit.

In FIG. 1A, the first carrier 112 is a wireless service provider otherwise known as an MNO (Mobile Network Operator), a carrier, cellular company, or wholesale data reseller, MVNO (Mobile Virtual Network Operator) or MVNE (Mobile Network Virtual Enabler), that typically controls a network and other infrastructure used to deliver services to its users. An example of first carrier 112 might be AT&T™. Another example might be Verizon™, etc.

As shown in FIG. 1A, first carrier 112 is also communicably coupled to a sharer 102 and a borrower 104 via the data share server 108. Here, data share server 108 may, for example, represent a virtual data provider, an MVNO or Mobile Virtual Network Operator that is an operator that acquires data wholesale from first carrier 112 or other like mobile network operators for redistribution, sharing and reallocation to users of first carrier 112 such as sharer 102 and borrower 104 as well as users of other wireless network carriers. Data share server 108 might be an intermediary between wireless carriers and the customers or users of such wireless carriers, Although not shown, additional data share servers 108 may be employed to enhance aspects of the present invention such as to increase data throughput, for example, to enable users to share, borrow and acquire or purchase data on the fly. As noted, data marketplace 100 of FIG. 1A includes sharer 102 and borrower 104 communicably coupled to data share server 108. Sharer 102 and borrower 104 represent users or customers of first carrier 112. A person skilled in the art will recognize that sharer 102 and borrower 104 may be customers of other wireless service providers not shown.

Here, as noted, sharer 102 might be a customer of first carrier 112. However, sharer 102 wishes to acquire or purchase additional data beyond his or her data plan with first carrier 112. Sharer 102 might purchase such additional data from data share server 108 and subsequently share any unused portion of the additional data with other users (in or out of network).

Borrower 104 is another customer of first carrier 112, where much of borrower 104's data plan is insufficient for borrower 104 so that borrower 104 has an overage from month to month. Therefore, borrower 104 might wish to borrow or purchase data to supplement the borrower's first carrier 112 data plan.

As shown in FIG. 1A, data marketplace further includes content provider 110 also communicably coupled to data share server 108 via Internet/communication system 106. Here, content provider 110 provides incentives to the first sharer 102 for sharing unused data. Incentives can be in the form of coupons, points, products, services, and the like. Content provider 110 can also purchase data from the data share server 108 to allow its users to share and borrow data to increase user engagement on their platform. Operation of data marketplace 100 will now be described.

In operation, data share server 108 acquires data wholesale from first carrier 112 or another wholesale reseller or MVNE. Data server 108 is now ready to distribute and reallocate the acquired data to users. It will be appreciated that data is interchangeable with wireless network credit.

Figure 5A:
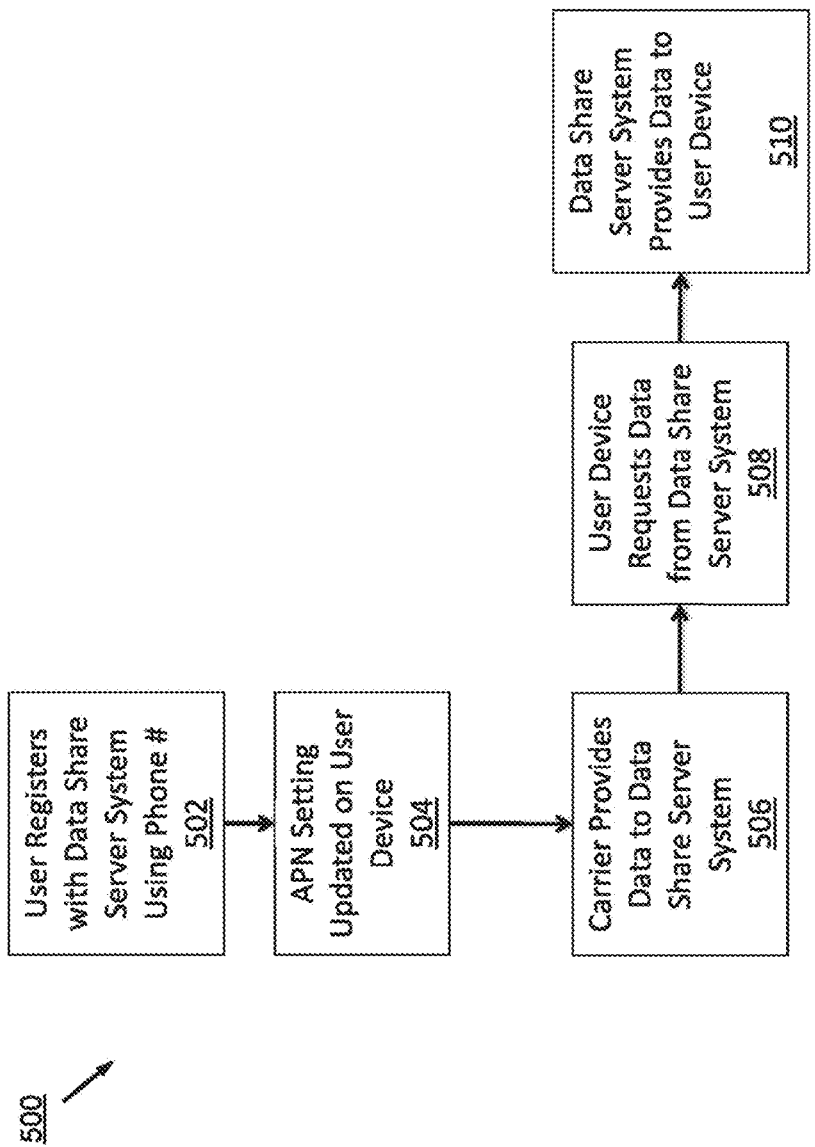
FIG. 5A illustrates an APN registration process according to an exemplary embodiment of the present invention.

In FIG. 1A, first sharer 102 registers with and purchases a data plan from data share server 108. In one embodiment, after first sharer 102 has registered, first carrier 112 is informed that data access has been changed by automatically changing first sharer 102's VPN (Virtual Private Network) or APN (Access Point Name) settings to that of data share server 108. The APN setting is generally an identifier on a mobile device that identifies an external network that the mobile device can access for data. This process is depicted in FIG. 5A.

After the data plan is purchased, data share server 108 provides data for the purchased plan based on the wholesale data acquired from first carrier 112. Thereafter, in one embodiment, the first sharer 102 utilizes a mobile application on his or her mobile device to access data share server 108 to use the data plan. First sharer 102 would utilize the purchased data plan in a customary fashion. However, if first sharer 102 has unused data as would typically occur toward the end of a billing cycle (for example), first sharer 102 uses the mobile application to initiate, facilitate and complete the process of sharing any unused portion of the purchased data plan. Similarly, first borrower 104 can also utilize a mobile application (not shown here) to access data share server 108 to enable borrowing of any available data shared by other users.

Borrowers may also register using a process similar to that of sharers. Borrowers may borrow or purchase data per megabyte based on their needs. In one embodiment, the borrowed data may be data shared by first sharer 102. In another embodiment, the data might be purchased from data share server 108. Further yet, the data might be a combination of shared data and purchased data.

The price at which borrowers borrow data may be determined by the average of prices set by sharers. The price may also be based on a price that borrowers are willing to pay for the data. Further, the price may be set by the data share server. Sharers can be incentivized to share data by providing them with redeemable points that can be redeemed for coupons from content providers. Borrowers can be provided with a Happy Hour where they can enjoy data at lower prices.

Among others, one advantage of the present invention is that data share server 108 can facilitate data acquisition, data sharing, data borrowing and corresponding incentivizing to enable such services.

Figure 1B:
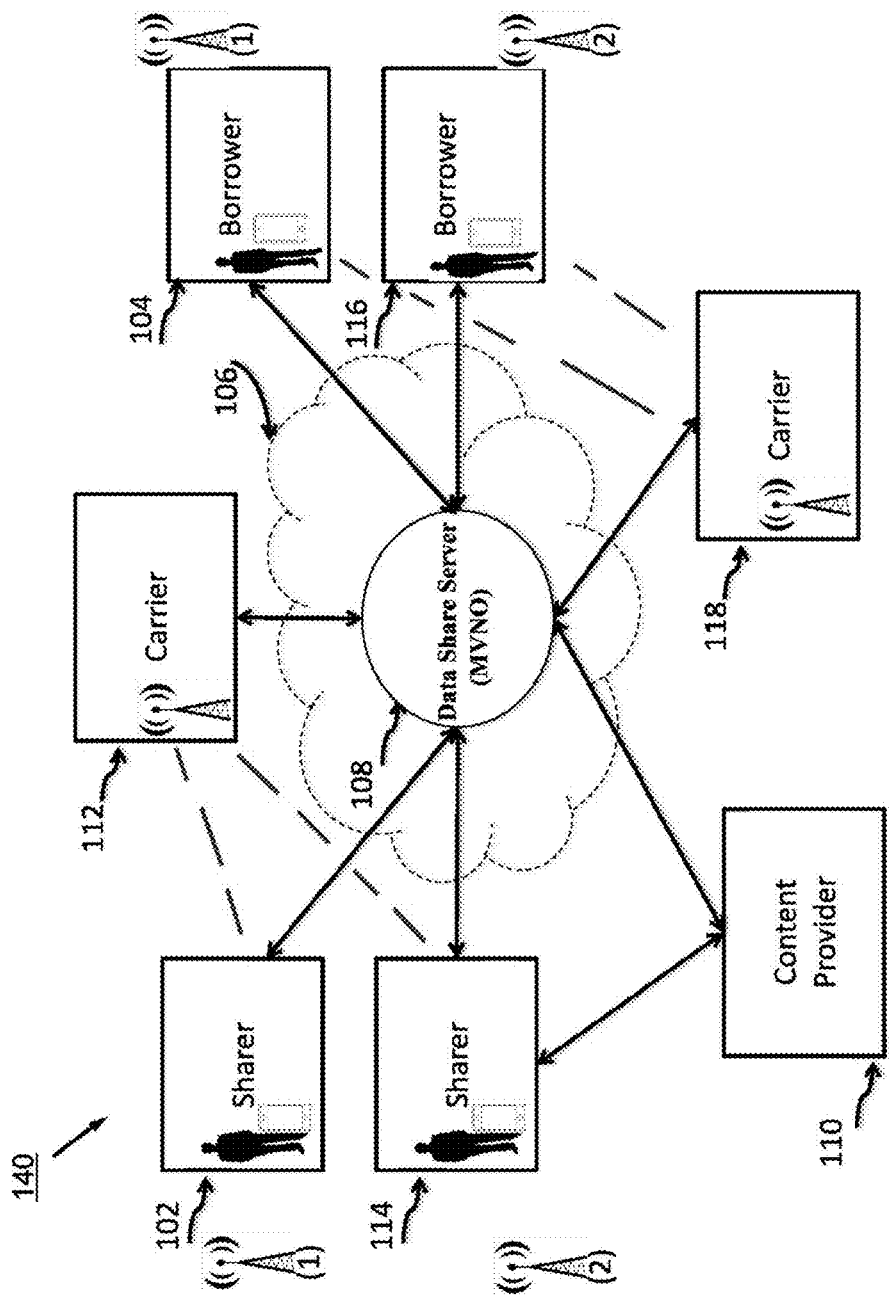
FIG. 1B illustrates a global cross-carrier data marketplace according to an exemplary embodiment of the present invention.

FIG. 1B illustrates a global cross-carrier data marketplace 140 according to an exemplary embodiment of the present invention.

In FIG. 1B, among other components, global cross-carrier data marketplace 140 also comprises a data share server 108 that is communicably coupled via Internet/communication network 106 to first carrier 112. As in FIG. 1A, global cross-carrier data marketplace 140 further includes first sharer 102 and first borrower 104 coupled to first carrier 112 via data share server 108.

However, unlike in FIG. 1A, global cross-carrier data marketplace 140 includes additional carriers, sharers and borrowers. Thus, as shown, in FIG. 1B, global cross-carrier data marketplace 140 includes a second carrier 118, a second sharer 114 and a second borrower 116.

In operation, in a first implementation, first sharer 102, second sharer 114 are subscribers of first carrier 112. Both of first sharer 102 and second sharer 114 have purchased data plans from carrier 112. First borrower 104 and second borrower 116 are also subscribers of second carrier 118. That is, first borrow 104 and second borrower 116 each has purchased a data plan from second carrier 118.

All sharers and borrowers then use their mobile devices to register with data share server 108. Specifically, first and second sharers 102 and 114 and first and second borrowers 104 and 116 use their mobile devices and a mobile application (not shown) to register with data share server 108. Registration profiles for sharers are then created and stored in a data store.

First sharer 102 and second sharer 114 begin to use their respective data plans in the regular manner. Prior to completion of the billing cycle, the sharers realize that they have unused data remaining in their data plans. The sharers at this point can decide to share their unused data with borrower 104 and borrower 116. This data sharing/borrowing feature occurs notwithstanding the fact that first borrower 104 and second borrower 116 are subscribed to on a different, separate or global carrier such as second carrier 118.

First sharer 102 begins the data share process by executing the mobile application to communicate with data share server 108. Specifically, the mobile application prompts data share server 108, which then communicates with first carrier 112 to the carrier that first sharer 102 wishes to share his or her unused data; relevant data including first sharer 102's username, phone number, account number and other pertinent information is communicated to first carrier 112 to authenticate that first sharer 102 is indeed a subscriber of first carrier 112, and that unused data exists within the first sharer's data plan.

Figure 1C:
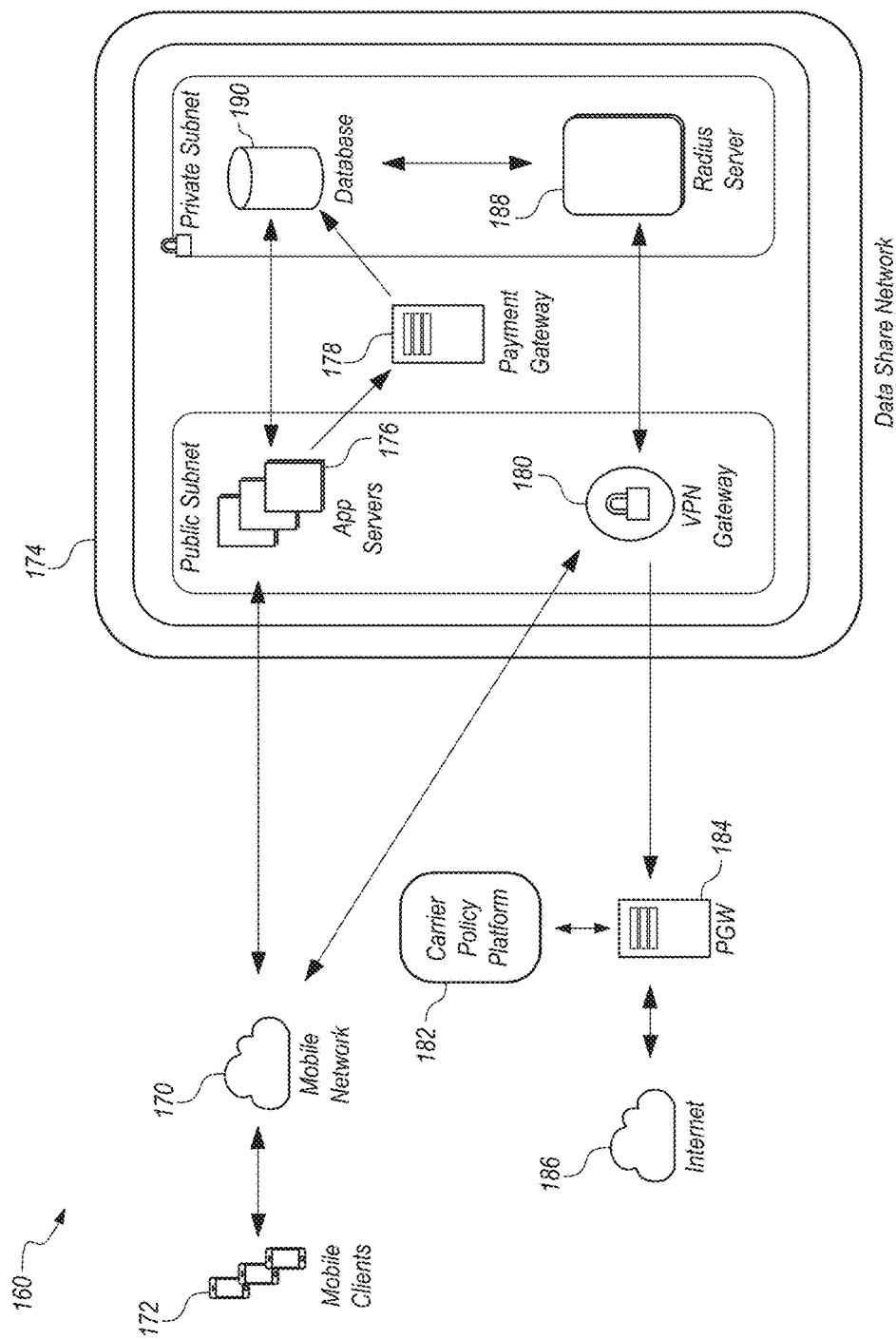
FIG. 1C illustrates a global cross-carrier data marketplace architecture according to an exemplary embodiment of the present invention.

After authentication, first carrier 112 then provides data share server 108 with access to first sharer 102's unused data (see FIG. 1C for a further description of this process). In one embodiment, first sharer 102 determines the cost of the unused data. In another embodiment, borrowers may determine the cost of the unused data. Further yet, the cost may be determined by an average cost of data across the system.

Borrowers may use the mobile application (not shown) to borrow the unused data from sharers 102 and/or purchase data per megabyte based on their needs. Thus, after determining that their data plan with carrier 118 might incur significant overage, either first borrower 104 or second borrower 116 can borrow data from first sharer 102 or second sharer 114. As noted, sharer 102 can provide an indication of the amount desired for the first data; which is then credited to the sharer's account in exchange for the borrowed data. The credits may be in the form of redeemable points.

In one embodiment, the borrowed data may be data shared by first sharer 102. In another embodiment, the data might be purchased from data share server 108. Further yet, the data might be a combination of shared data and purchased data.

In this manner, the data share server 108 of the present invention can facilitate global, cross-carrier acquisition and data borrowing and sharing. An embodiment of the present invention establishes a data marketplace that allows users, sharers and borrowers to utilize a single application interface to share and borrow data across global and multiple carriers.

In an alternate implementation, sharers and borrowers can share/borrower data from a data pool established by data share server 108. Thus, data share server 108 might purchase wholesale data from both first carrier 112 and from second carrier 118. Thereafter, users such as first sharer 102 and second sharer 114 can then purchase data plans. In one embodiment, data for data plans purchased by users can come from a specific carrier. For example, first sharer 102 can purchase a data plan and receive data only from first carrier 112, whereas the data plan purchased by second sharer 114 is tied only to second carrier 118.

In another embodiment, data for purchased plans can come from a combination of both the first and second carriers. For example, first sharer 102 can receive data from both first carrier 112 and second carrier 118. Second sharer 114 can also receive a data plan based on first carrier 112 and second carrier 118.

After a plan is purchased, the user may also share unused data for use by borrowers as in FIG. 1.

Otherwise, the embodiment of FIG. 1B functions similarly to the embodiment depicted in FIG. 1A. The embodiment of FIG. 1B illustrates the applicability of the present invention to multiple carrier and multiple sharer and borrower scenarios. It will be appreciated that, while two carriers and four users are shown in the example of FIG. 1B, the present invention extends beyond two carriers and beyond four users.

In FIG. 1B, data share server 108 can also detect when a poor connection exists for a borrower, and can dynamically switch carriers for the sharer or borrower. For example, first borrower 104 is utilizing data from the first carrier 112. First borrower 104 happens to be in an area where the first carrier's coverage is poor. Data share server 108 detects the poor connection and provides first borrower 104 with data from another carrier, for example second carrier 118.

FIG. 1C illustrates a global cross-carrier data marketplace architecture 160 according to an exemplary embodiment of the present invention.

In FIG. 1C, mobile clients may employ global cross-carrier data marketplace to share data, i.e., access the Internet globally across carriers. Specifically, mobile clients 172 use mobile or cellular data network 170 and data share network 174 to access Internet 186 across multiple carriers.

As shown, the data share network 174 itself comprises a network of servers to provide data sharing services. Specifically, data share network 174 includes a cluster of application servers 176 provides all system services of the share network 174. The application servers 176 communicates with other servers and manages services such as user authentication and authorization, user accounting, borrowing, sharing, on-demand purchasing, billing, and customer support.

In FIG. 1C, a payment gateway 178 performs billing functions for the data share network 174. Billing functions include saving credit card information, validating credit cards, and securely processing payments.

In FIG. 1C, a VPN (Virtual Private Network) server or gateway 180 establishes a VPN tunnel between a mobile device (172) and the VPN server 180 upon receiving a request for a data share session from the mobile device 172. This tunnel enables all traffic from the mobile device 172 to pass through the data share VPN server 180.

In FIG. 1C, a carrier policy platform 182 enables zero-rating of all traffic passing through the data share VPN server's 180 IP address for all subscribers to the data share network 174. This is achieved by providing cellular network carriers with the VPN server's 180 IP address, so that a rule is added in the carrier policy platform whitelisting the VPN server's 180 IP address. All user traffic, after passing through the tunnel created by VPN server 180, travels via a carrier's PDN gateway (PGW) 184 to access the Internet 186.

In FIG. 1C, a radius server 188 provides authentication, authorization, accounting, session management of VPN sessions for all data share network subscribers interested in borrowing and purchasing on-demand data. A database 190 creates, retrieves, updates, deletes, and stores all system related information.

Figure 2:
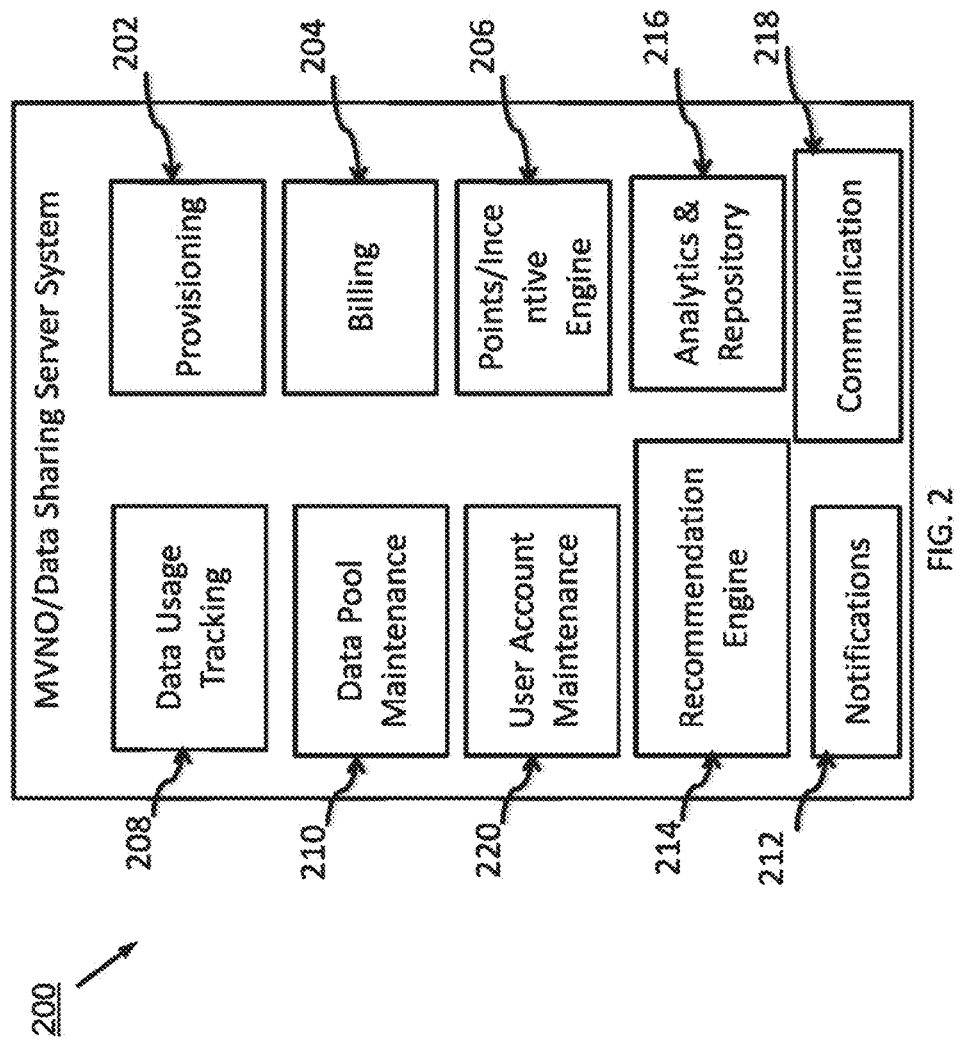
FIG. 2 illustrates a data share server according to an exemplary embodiment of the present invention.

FIG. 2 illustrates data share server system 200 according to an exemplary embodiment of the present invention.

In FIG. 2, data share server system 200 comprises various modules enabling sharing functionality and ensuring high quality uninterrupted data connection. It will be appreciated that the functionality described herein may be separate and need not be integrated within data share server system 200.

As shown, data share server system 200 includes provisioning 202 capabilities in order to provision user accounts. Billing 204 capabilities enable buying of data packages, calculating costs at which data can be borrowed, and billing users per session based on data usage.

A points or incentive engine 206 maintains and provides information about incentives available and provided to sharers based on their contribution to the shared pool of data. This engine also facilitates redemption of incentives. Savings engine 206 can also provide information to a user regarding how much in total cost savings the user has received as a result of participating in the share network. For example, a user only consuming 100 MB can possible only pay the share network one dollar yet would have paid fifteen dollars to the carrier. The user will enjoy having an indication of the 93% savings displayed.

Data share server system 200 tracks all real-time data usage 208. This includes host carrier and shared pool usage, shared and borrowed data, and maintenance of the shared pool of data 210. Quality of connection is also tracked so that the system 200 can cause a dynamic network change to be made in the event of poor connections. For example, the connection quality experienced by a first mobile device may be monitored. A minimum quality threshold can be set.

When that minimum quality threshold is exceeded, data might be allocated to the first mobile device account, where the data is allocated from a different carrier with an improved connection quality.

Data share server system 200 includes a recommendation engine to provide recommendations to users based on their data usage, their friends' data usage, or share network users' data usage. The system 200 also includes notification capabilities 212 to notify users of their data usage.

Analytics and repository capabilities 216 maintain a history of plan purchases, share or borrow or on-demand buy sessions. This also provides monthly statistics or any other aggregation of data collected necessary. Additional information recorded by analytics 216 includes active users, unique users, new users, user session lengths, retention rate, crash reports, application usage, and user demographics.

Data share server system 200 includes network communication capability 218, as well as an engine for maintaining user and user mobile device account and registration information 220. The user account maintenance engine 220 enables initial registration of new users and associated mobile devices, as well as authentication of registered users and associated mobile devices requesting data.

Figure 9:
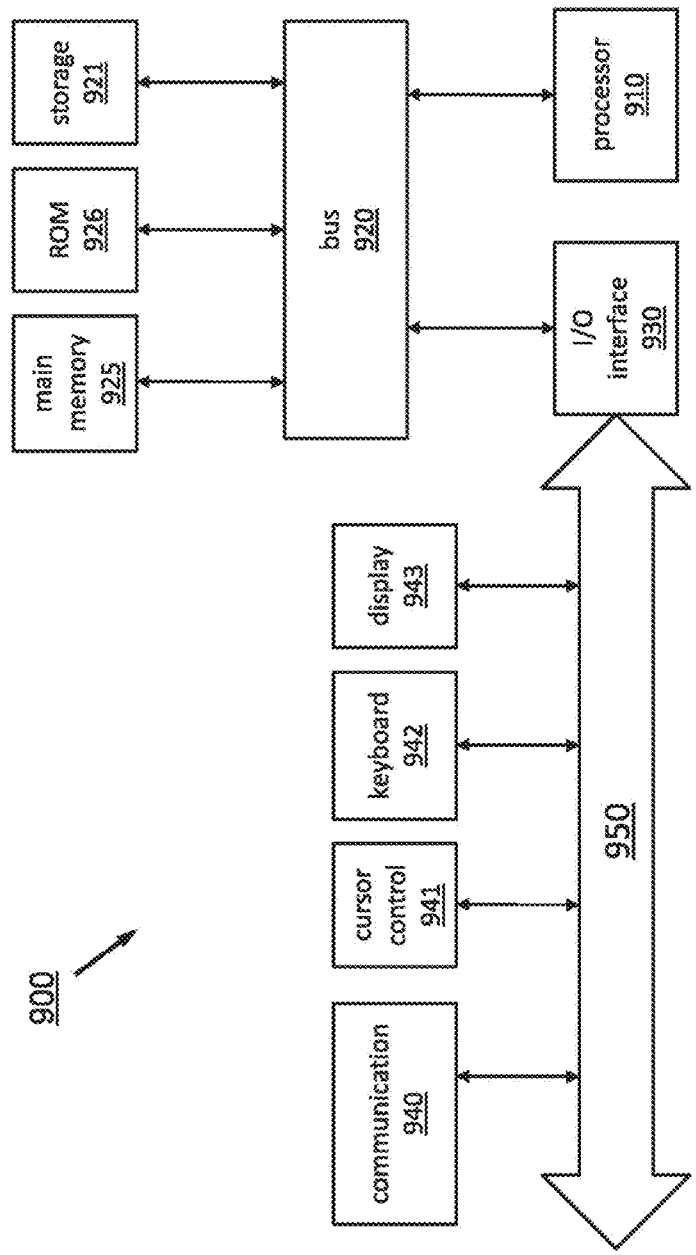
FIG. 9 illustrates an exemplary computer architecture for use with an exemplary embodiment of the present invention.

According to one embodiment, data share server system 200 employs an architecture similar to that depicted in FIG. 9.

FIG. 3 illustrates a data sharing mobile application 300 according to an exemplary embodiment of the present invention.

In FIG. 3, mobile application 300 provides a graphical user interface 302 to all server functionalities. Mobile application 300 includes several input options 304 based on the desired functionality. Examples of input options 304 include a circular sliding bar to set a sharing limit or a borrowing limit, and a field for setting a selling price for sharable data. Incentive information 312 is displayed to the user through mobile application 300.

Mobile application 300 displays data usage information 310. Data usage information 310 can be real time data usage, total shared and borrowed megabytes, total redeemable points, data usage statistics (e.g., per month usage). Mobile application 300 also includes an option to request a change in APN, VPN, and network proxy settings to use data from the shared data pool.

Mobile application 300 displays carrier information 308, including carrier name, connection type (e.g., 3g, 4g), data plan limit, and billing date. The data plan limit and billing date can be set by the user in the application 300 so that data usage and notifications are displayed appropriately. For example, a user may want to know when he or she has reach 80% of their data plan limit. The user can also view a history of plans purchased, and share and borrow or on-demand buy sessions.

Mobile application 300 enables a user to browse and purchase data plans, and the user may save payment information 306 for ease in purchasing data plans and on-demand data. Multiple credit cards can be saved, and one can be designated as default.

Mobile application 300 enables a user to share and borrow data via social networking 314 (e.g., Facebook). Mobile application 300 also enables live support 316, whereby a user can chat with a live specialist of their choice. Instant live support 316 automates the traditional customer support call flow and reduces time and hassle to get issues resolved for users as well as carriers.

Mobile application 300 can include multiple screens. For example, a sharer screen can display real time data shared, redeemable points collected on completion of a sharing session, and fields for inputting limits or selling prices for data shared. As a further example, a borrower screen can display the cost at which data can be borrowed, real time data borrowed and the current cost associated with it, and a field for inputting a limit for data borrowed during a borrow session.

FIGS. 4B, 4C, 4D, 4E, 4F, and 4G illustrate exemplary features as described herein in mobile application 300, highlighted in interfaces 410, 420, 430, 440, 450, and 460.

FIG. 4A illustrates a content provider website interface 400 according to an exemplary embodiment of the present invention.

In FIG. 4A, a website interface 400 is provided by a content provider. The web interface 400 includes content 402 for consumption by a mobile computing device. In the event the mobile computing device does not have a data allowance to cover what is necessary for consumption of content 402, the web interface 400 includes a capability whereby data can be purchased 404. by one or more data share servers, providing a third plurality of network data credits to a third mobile device account, wherein the third plurality of network data credits is a quantity required for access to a selected piece of content. The selected piece of content might be video, a digital voice file, a document, or an mp3 file, for example.

In order to utilize the data purchase capability 404 (e.g., in the form of a button for selection), the mobile computing device must be registered with a data share server system that will provide the data.

As an example, a content provider is YouTube™. YouTube™ would like to enable visitors to YouTube™ or mobile application to purchase data in order to consume content on the website or mobile application. Data share server system provides YouTube™ with an SDK so that YouTube™ may embed a selection option for data purchase on its website or in its mobile application. A registered user of data share server system may select the option (e.g., in the form of a button) to purchase data, and can control how much data is purchased. The registered user may only desire enough data to consume a specific piece of content, such as a video. This is but one example of a content provider for use with the present invention. Other examples are Hulu™, Facebook™, Netflix™, Tumblr™, and other applications and websites requiring the use of data within the spirit and scope of the present invention. For reference, FIG. 4G illustrates a mobile application interface 460 including Netflix™ as a content provider.

Figure 4B:
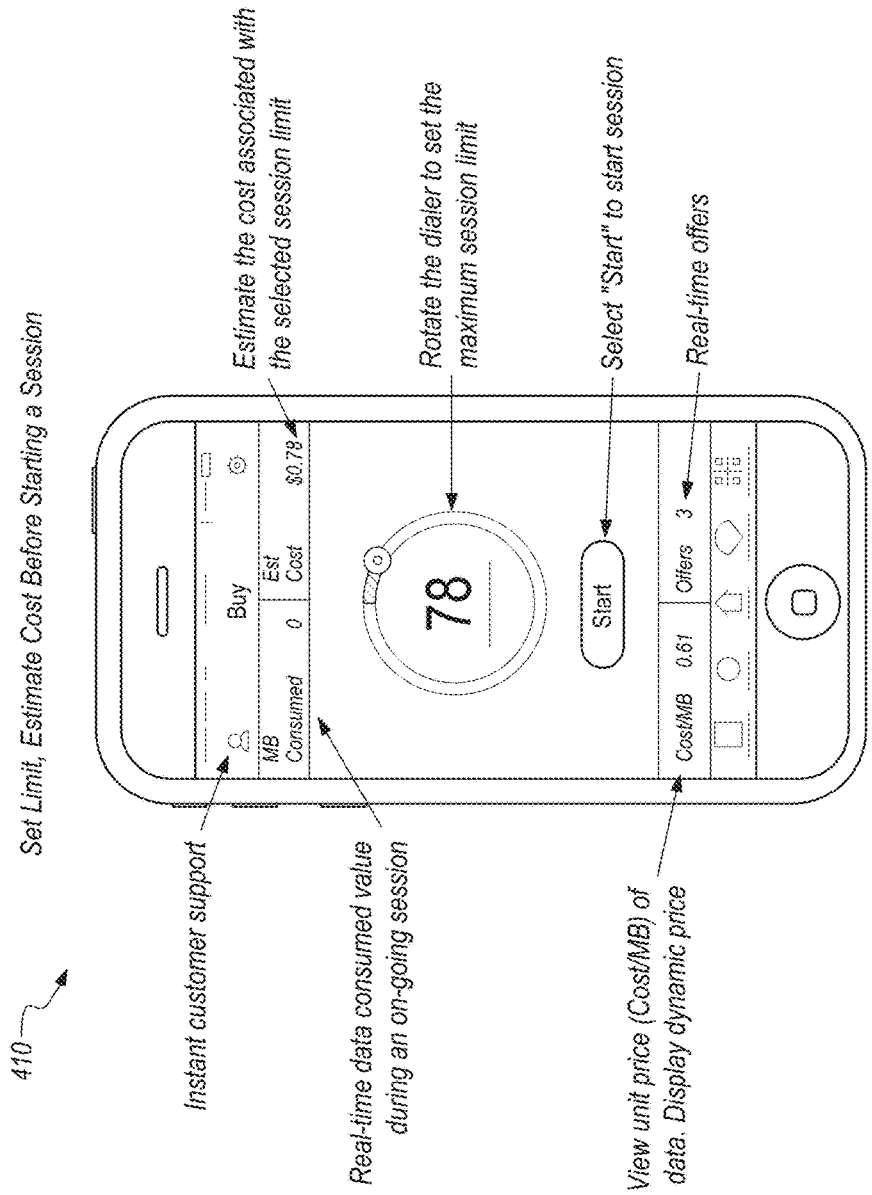
FIG. 4B illustrates a mobile application interface according to an exemplary embodiment of the present invention.
Figure 4C:
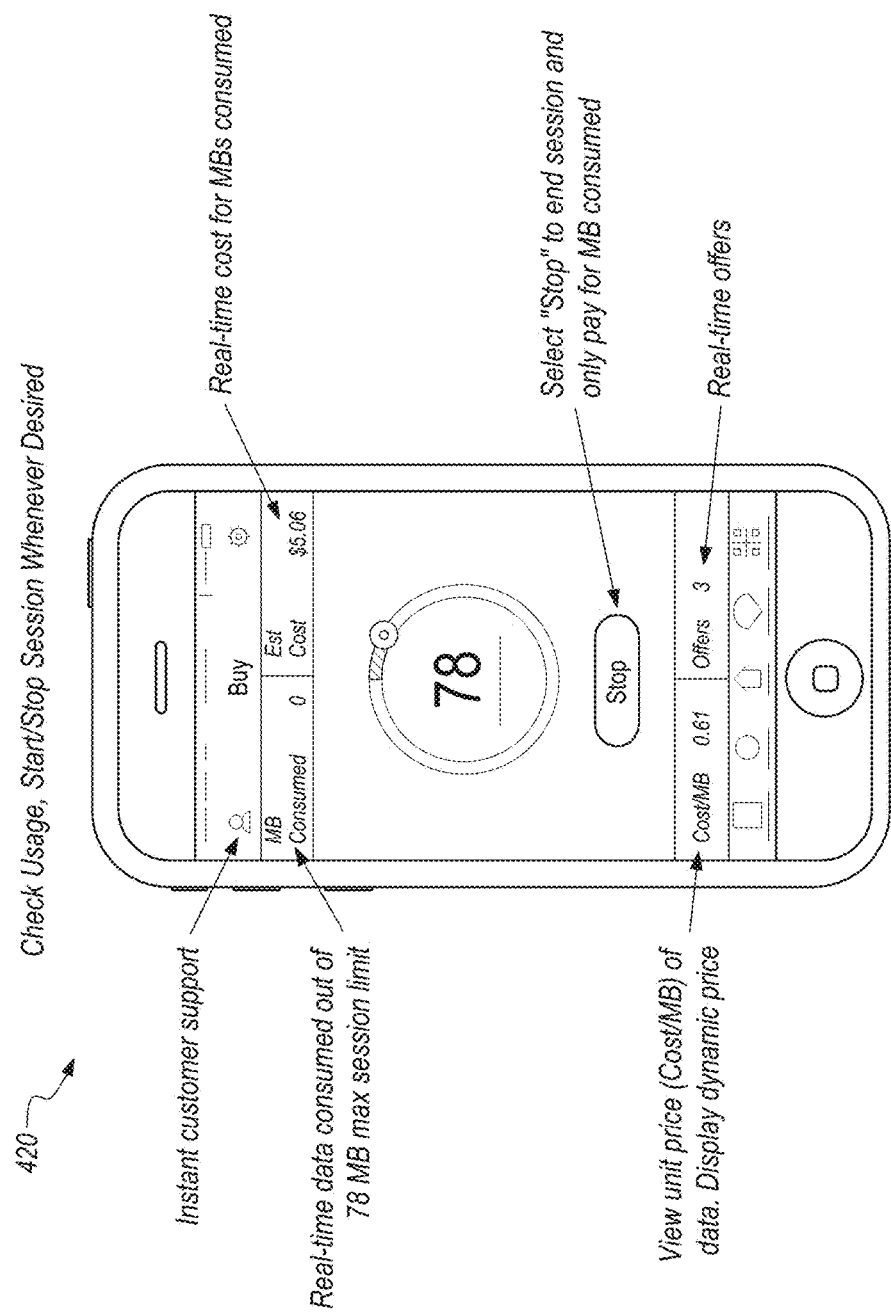
FIG. 4C illustrates a mobile application interface according to an exemplary embodiment of the present invention.
Figure 4D:
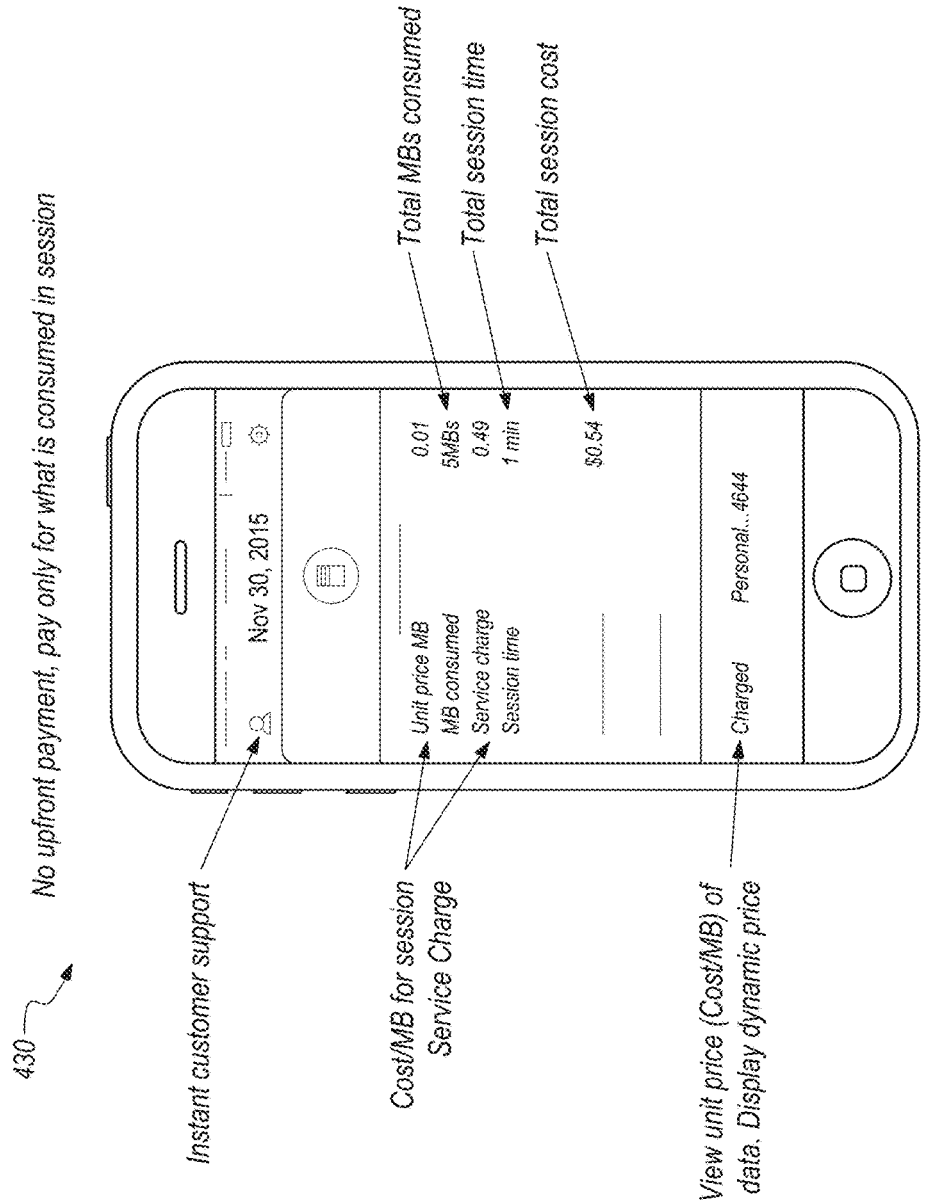
FIG. 4D illustrates a mobile application interface according to an exemplary embodiment of the present invention.
Figure 4G:
FIG. 4G illustrates a mobile application interface according to an exemplary embodiment of the present invention.

In FIG. 4G, as shown, an exemplary mobile application interface 460 includes content available from Netflix™. Triangles 465 in the corner of displayed content enable purchase of just enough data to consume the illustrated piece of content. In one embodiment, partial allocations of data are sponsored or subsidized by the content provider.

FIG. 5A illustrates an APN registration process 500 according to an exemplary embodiment of the present invention.

An Access Point Name (APN) is the name for the settings a mobile device reads to set up a connection to the gateway between a mobile device's carrier's cellular network and the public Internet. The carrier reads these settings, then determines a correct IP address or connects to the correct secure gateway.

In FIG. 5A, a user mobile device registers with a data share server system 502. An APN setting on the user mobile device is updated 504. Thereafter, a carrier provides data to the data share server system 506 and the data share server system provides data to the user mobile device 510 upon receiving a request for data from the device 508.

FIG. 5B illustrates a VPN registration process 540 according to an exemplary embodiment of the present invention.

Virtual Private Networks (VPN) enable communication of private information securely over a public network.

In FIG. 5B, a user mobile device registers with a data share server system 512. A VPN profile is installed or set up on the user mobile device 514. The user mobile device starts a session to request data 516. A VPN tunnel is established between the user device and the share server system 518. This enables all traffic from the use mobile device passes through the share server system's VPN server. The VPN server's IP address is whitelisted by the carrier 520 so that all traffic passing through the VPN server is zero-rated by the carrier for its subscribers. Data is provided to the user mobile device, and once the user stops the session, the shared server system will bill the user for the data consumed 520.

FIG. 5C illustrates a network proxy registration process 550 according to an exemplary embodiment of the present invention.

In FIG. 5C, a user mobile device registers with a data share server system 524. An IP address associated with a data share server system is whitelisted by a carrier 526. The user mobile device requests data 528 and the carrier recognizes the whitelisted IP address and forwards the request to a network proxy server 530. The network proxy server 530 is associated with the data share server system. Then the data share server system provides data to the user mobile device 532.

Figure 5D:
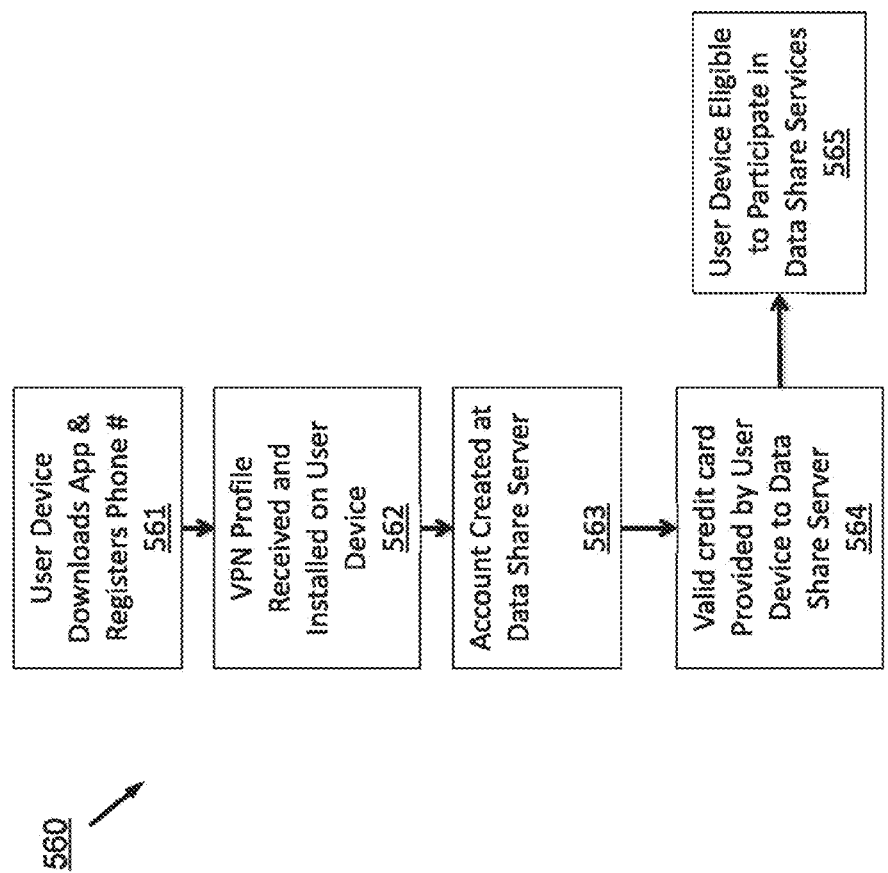
FIG. 5D illustrates a data share network registration process for use with an exemplary embodiment of the present invention.

FIG. 5D illustrates a data share network registration process 560 for use with an exemplary embodiment of the present invention.

In FIG. 5D, a mobile device user downloads a mobile application to the mobile device and registers with the data share network using the user's phone number 561. During registration, the data share network server pushes a VPN profile to the mobile device, and the VPN profile is installed on the device 562. Upon successful registration and installation of the VPN profile, the user's account is created 563 at the data share network server. Once the user provides a valid credit card to the data share server 564, the user mobile device is eligible to participate in data share services 565 (e.g., sharing, borrowing, purchasing).

Figure 5E:
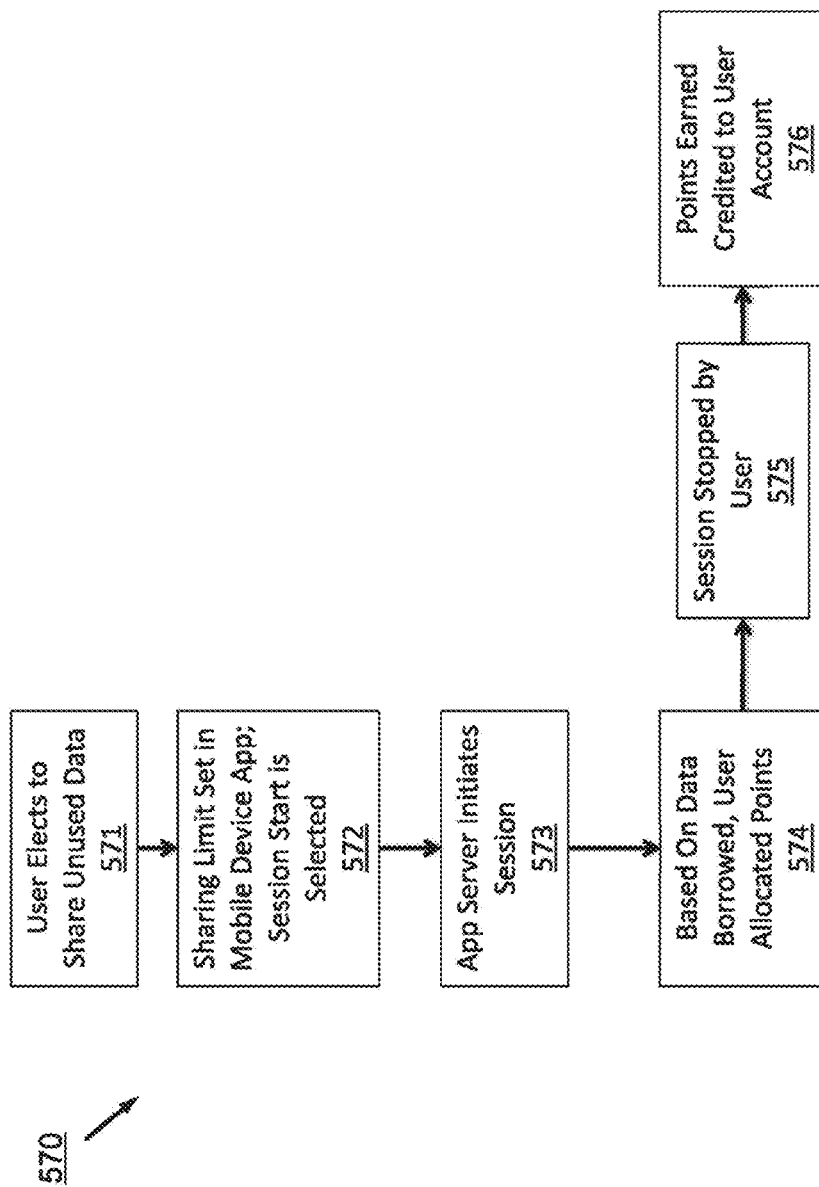
FIG. 5E illustrates a data sharing process for use with an exemplary embodiment of the present invention.

FIG. 5E illustrates a data sharing process 570 for use with an exemplary embodiment of the present invention.

In FIG. 5E, a user has decided to share unused data 571. The unused data can be either from the user's host carrier data plan or from a plan purchased from the data share network.

In FIG. 5E, the user sets a sharing limit using the previously downloaded mobile application and selects to start a session 572. The application server initiates a session by adding the data contributed by the user to the shared network data pool.

In FIG. 5E, based on data borrowed in real time by borrowers, from the sharer's unused data, points are allocated to the sharer 574. The number of points is decided by comparing one sharer's contribution to other sharers in the pool and the amount of data consumed by borrowers. Sharers can revisit the mobile application at any point in time to view how many MBs have been shared and how many points they have earned for sharing data. The sharer may also stop the session at any point.

In FIG. 5E, the sharer or user stops the sharing session 575 and the points earned are credited to the user's account 576.

Figure 5F:
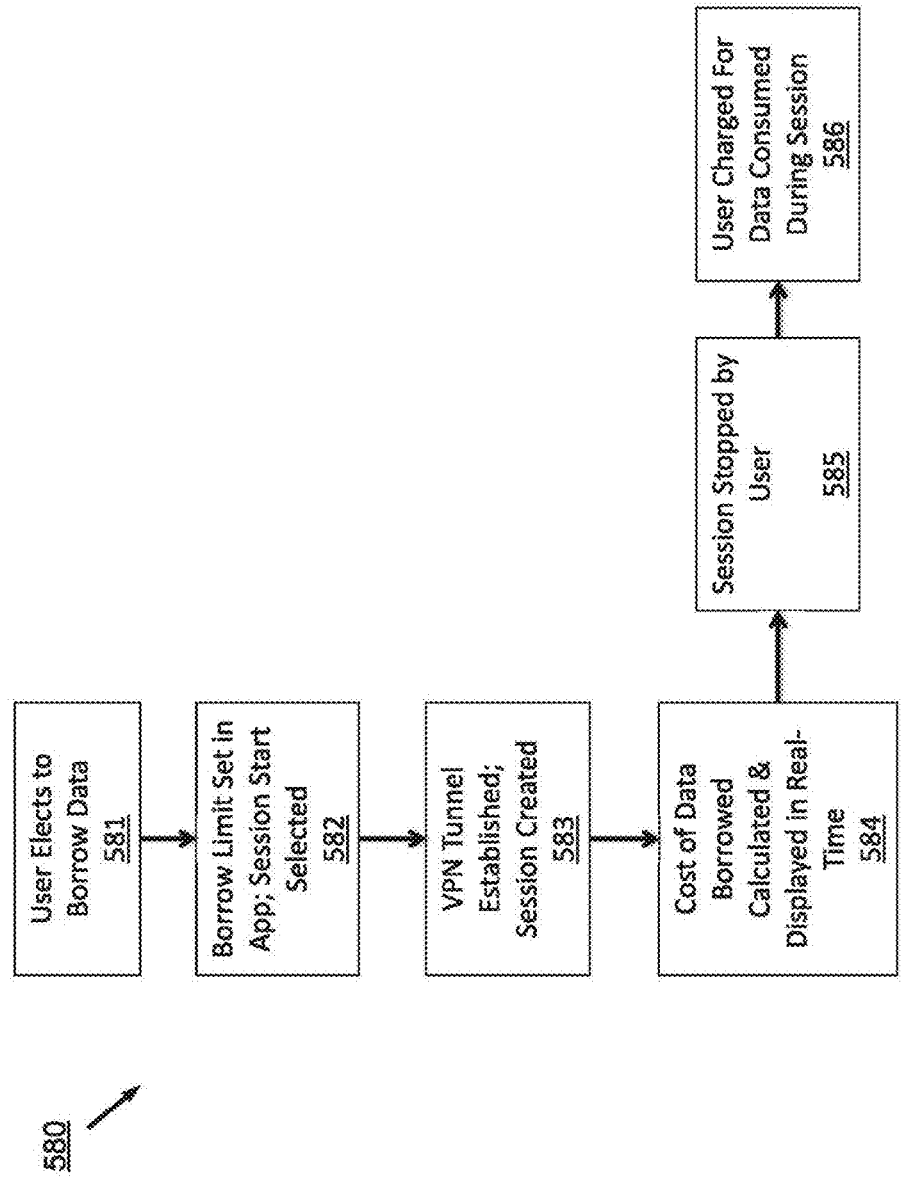
FIG. 5F illustrates a data borrowing process for use with an exemplary embodiment of the present invention.

FIG. 5F illustrates a data borrowing process 580 for use with an exemplary embodiment of the present invention.

In FIG. 5F, a user has decided to borrow data 581 from the shared network data pool.

In FIG. 5F, the user sets a borrowing limit using the previously downloaded mobile application and selects to start a session 582. The VPN server establishes a tunnel between the user device and the shared network VPN server and creates a session 583. The application server ensures there is enough data in the data pool to support all borrowers. If there is not, the user is redirected to an on-demand purchasing process (e.g., FIG. 5G).

In FIG. 5F, based on data borrowed, the cost of data is calculated and displayed in real-time in the mobile application 584. Borrowers can revisit the mobile application at any point in time to view how many MBs have been consumed and how much the consumption costs. The borrower may also stop the session at any point.

In FIG. 5F, the borrower or user stops the session 585 and is charged for the data consumed 586.

Figure 5G:
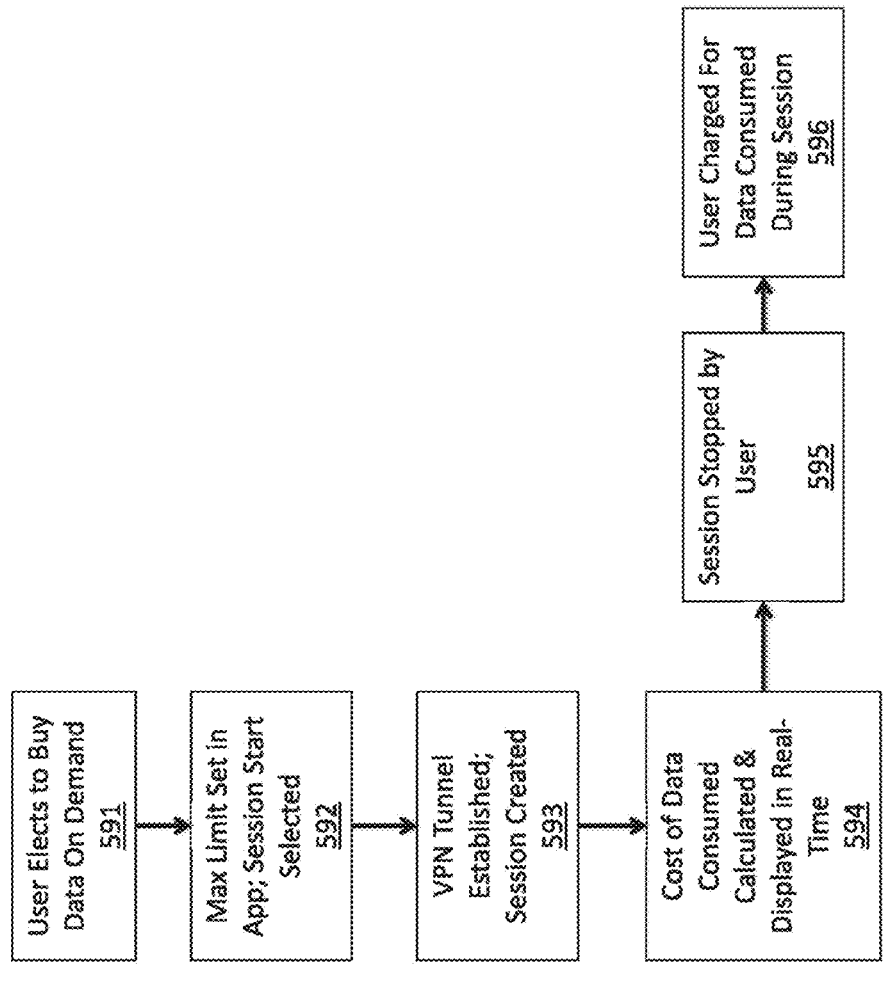
FIG. 5G illustrates an on-demand buying process for use with an exemplary embodiment of the present invention.

FIG. 5G illustrates an on-demand buying process 590 for use with an exemplary embodiment of the present invention.

In FIG. 5G, a user has decided to purchase on-demand data 591 from the shared network.

In FIG. 5G, the user sets a purchasing limit using the previously downloaded mobile application and selects to start a session 592. The VPN server establishes a tunnel between the user device and the shared network VPN server and creates a session 593.

In FIG. 5G, based on data consumed, the cost of data is calculated and displayed in real-time in the mobile application 594. Purchasers can revisit the mobile application at any point in time to view how many MBs have been consumed and how much the consumption costs. The purchaser may also stop the session at any point.

In FIG. 5F, the purchaser or user stops the session 595 and is charged for the data consumed 596.

Figure 6:
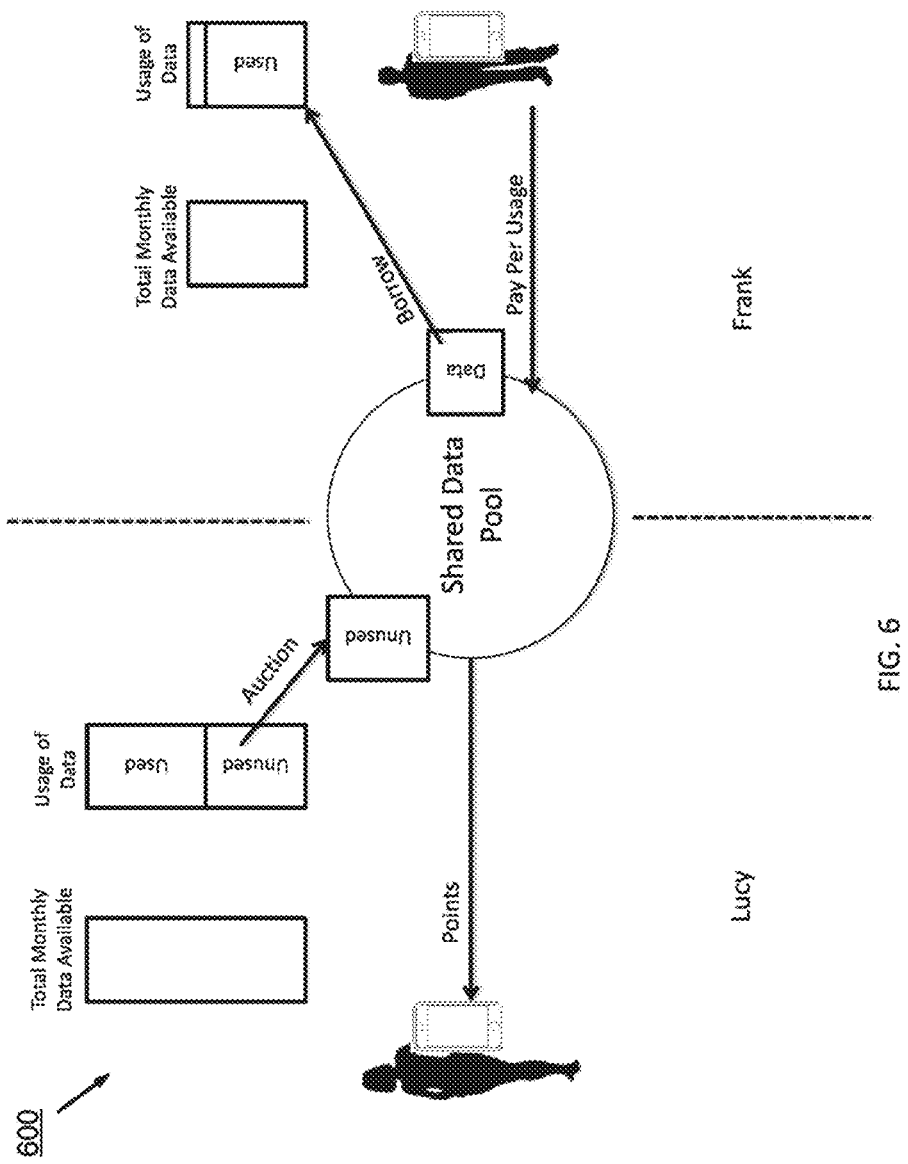
FIG. 6 illustrates a sharing process for use with an exemplary embodiment of the present invention.

FIG. 6 illustrates a sharing process 600 for use with an exemplary embodiment of the present invention.

In FIG. 6, a user, Lucy, has a large data plan resulting in a large total amount of data available per month. Another user, Frank, has a more limited data plan resulting in less total data available per month. Lucy is able to auction off a portion of her unused data to the shared data pool, at a price she sets. Frank borrows an amount of data he needs from the shared data pool, at a price averaged across all prices set by sharers. Lucy receives incentives or points to redeem based on the amount of data she contributed to the shared data pool. Frank is charged for the amount of data he ends up consuming.

Figure 7:
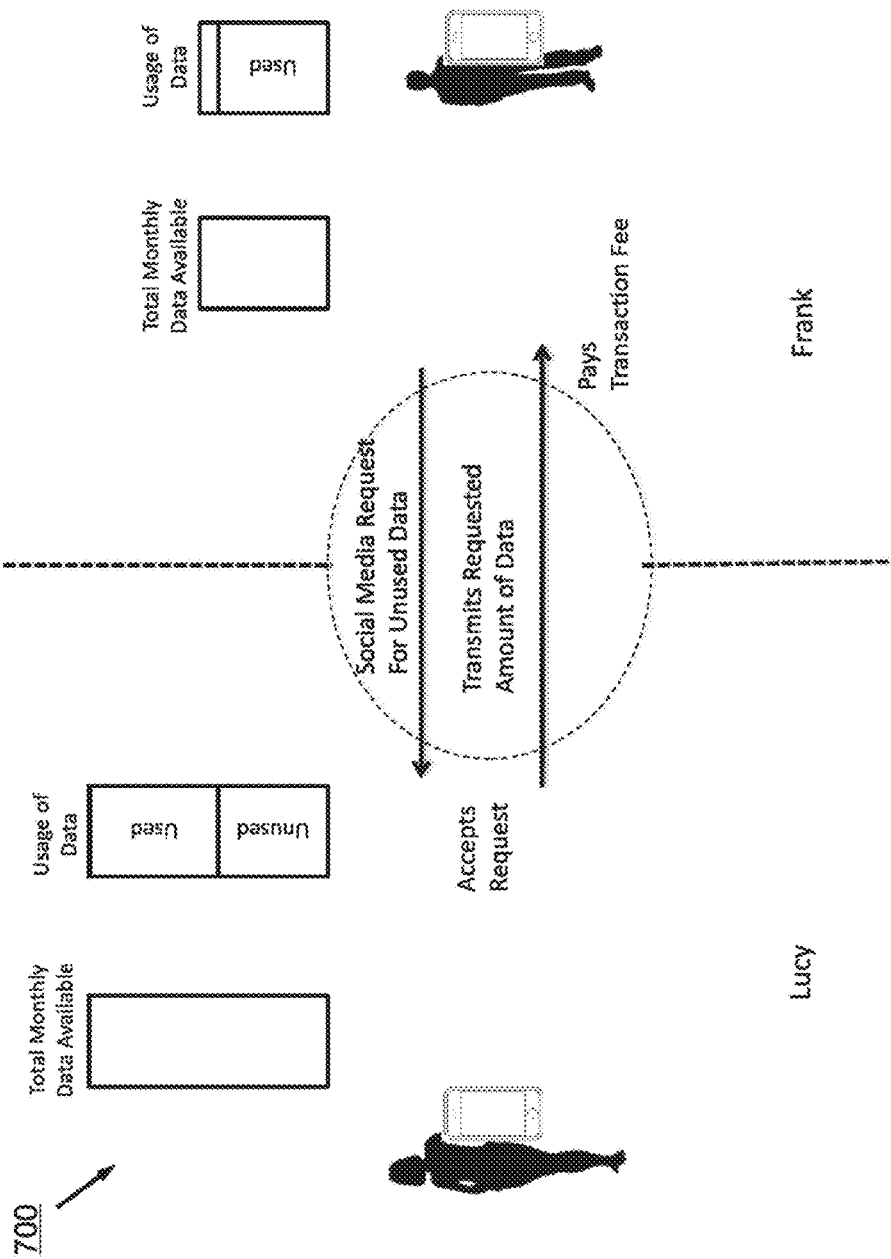
FIG. 7 illustrates a social sharing process for use with an exemplary embodiment of the present invention.

FIG. 7 illustrates a social sharing process 700 for use with an exemplary embodiment of the present invention.

In FIG. 7, Lucy has a large data plan with a large total monthly amount of data available. Frank has a smaller data plan and therefore less total data available per month. Frank uses a shared data mobile application to send Lucy a request for data via a social media site (e.g., Facebook). Frank's request can include a specific amount of data requested. Lucy accepts the request and transmits, via the shared data mobile application, the requested amount of data. Frank receives the data and pays a transaction fee.

Figure 8:
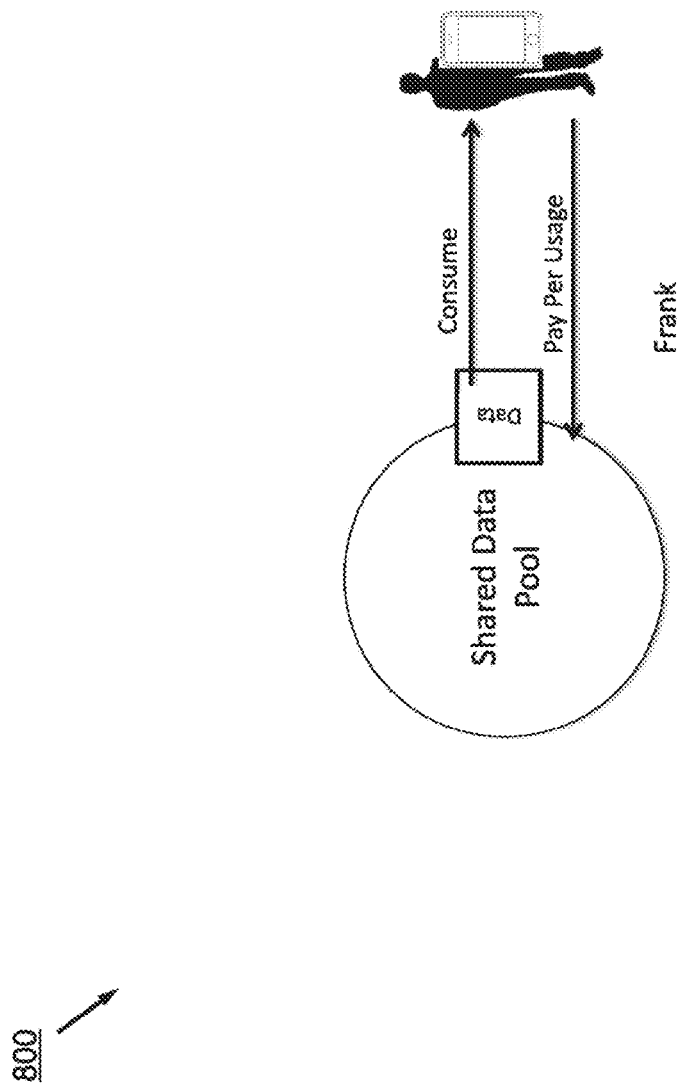
FIG. 8 illustrates a borrowing process for use with an exemplary embodiment of the present invention.

FIG. 8 illustrates a borrowing process 800 for use with an exemplary embodiment of the present invention.

In FIG. 8, Frank buys on-demand data directly through the shared network mobile application or SDK at a metered rate. The metered rate can involve Frank paying per megabyte consumed. Frank can start and stop his on-demand buy session at his will, and he is only charged for an individual session and for what he consumed. One example of the on-demand buy process 800 depicted in FIG. 8 is the website interface scenario depicted in FIG. 4 above.

According to one embodiment, the global data sharing marketplace can offer happy hour or surge pricing based on times of day and data availability. Such dynamic pricing can include considerations for peak and non-peak data consumption times.

According to one embodiment, dynamic pricing can also include a sliding scale for the price of data. For example, the price of data can be inversely proportional to the consumption for each user. Further, depending on the usage range, the price a user might pay for data can vary to ensure they are not paying more than the overage charge their carrier would charge at any given time.

FIG. 9 illustrates an exemplary computer architecture 900 for use with an exemplary embodiment of the present invention.

The present invention comprises various computing entities that may have an architecture according to exemplary architecture 900. One embodiment of architecture 900 comprises a system bus 920 for communicating information, and a processor 910 coupled to bus 920 for processing information. Architecture 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Architecture 900 may also include a read only memory (ROM) and/or other static storage device 926 coupled to bus 920 for storing static information and instructions used by processor 910.

A data storage device 925 such as a magnetic disk or optical disc and its corresponding drive may also be coupled to architecture 900 for storing information and instructions. Architecture 900 can also be coupled to a second I/O bus 950 via an I/O interface 930. A plurality of I/O devices may be coupled to I/O bus 950, including a display device 943, an input device (e.g., an alphanumeric input device 942 and/or a cursor control device 941).

The communication device 940 allows for access to other computers (e.g., servers or clients) via a network. The communication device 940 may comprise one or more modems, network interface cards, wireless network interfaces or other interface devices, such as those used for coupling to Ethernet, token ring, or other types of networks.

While the above is a complete description of exemplary specific embodiments of the invention, additional embodiments are also possible. For example, the present invention is not limited to mobile communication systems and methods but is also applicable to Internet communication as well Internet enabled devices and transceivers that send and receive data. Thus, the above description should not be taken as limiting the scope of the invention.

We claim:

1. A method comprising:
by one or more data share servers, creating and storing in a data store, registration profiles for a plurality of mobile device accounts associated with a plurality of wireless network carriers, the plurality of mobile accounts including a first mobile device account associated with a first wireless network carrier and a second mobile device account associated with a second wireless network carrier, wherein the first wireless network carrier and the second wireless network carrier are based on distinct and separate wireless networks that are communicably uncoupled from each other;

by one or more data share servers, upon request from the first mobile device account, communicating with the first wireless network carrier to receive a first plurality of network data credits from the first wireless network carrier, wherein the first plurality of network data credits is based on network data credits allocated by the first wireless network carrier to the first mobile device account;

by one or more data share servers, upon request from the second mobile device account, communicating with the second wireless network carrier to receive a second plurality of network data credits from the second wireless network carrier, wherein the second plurality of network data credits is based on network data credits allocated by the second wireless network carrier to the second mobile device account;

by one or more data share servers, creating a third-party shared data pool for including at least the first plurality of network data credits and a third plurality of network data credits, wherein the third plurality of network data credits is related neither to the first mobile device account nor the second mobile device account, said third plurality of network data credits being acquired from the first wireless network carrier or the second wireless network carrier;

by the one or more data share servers, upon request from the second mobile device account, allocating the first plurality of network data credits to the second mobile device account associated with the second wireless network carrier, and wherein the request from the second mobile device account is by executing a data share mobile application on the second mobile device, said data share mobile application further being configured to authorize dynamic changing of the Access Point Name (APN) for accessing the third-party shared data pool.

2. The method of claim 1, further comprising:
by one or more data share servers, monitoring connection quality experienced by the first mobile device; and
by one or more data share servers, upon exceeding a minimum quality threshold, providing network data credits to the first mobile device account, wherein the network data credits are allocated from a different carrier with an improved connection quality.

3. The method of claim 1, further comprising:
by one or more data share servers, providing a third plurality of network data credits to a third mobile device account, wherein the third plurality of network data credits is a quantity required for access to a selected piece of content.

4. The method of claim 3, wherein the selected piece of content is one or more of a video, a digital voice file, a document, and an mp3 file.

5. The method of claim 1, wherein the first wireless network carrier is geographically located separately from the second wireless network carrier.

6. The method of claim 5, wherein the first mobile device account and the second mobile device account are located within a first country.

7. The method of claim 6, wherein the first wireless network carrier is located within the first country and the second wireless network carrier is located within a second country.

8. The method of claim 1, wherein the first mobile device and the second mobile device are members of a social networking community.

9. The method of claim 8, wherein the social networking community is one of Facebook, LinkedIn, YouTube, Twitter, or Instagram.

10. The method of claim 1, further comprising:
by one or more data share servers, receiving from the first mobile device account, an indication of an amount of currency desired for the first plurality of network data credits; and
by one or more data share servers, crediting the first mobile device account with currency in exchange for the first plurality of network data credits.

11. In a communication network, a computer-implement method comprising:
causing storage of registration profiles for a plurality of mobile device accounts associated with a plurality of wireless network carriers, the plurality of mobile accounts including a first mobile device account associated with a first wireless network carrier and a second mobile device account associated with a second wireless network carrier, wherein the first wireless network carrier and the second wireless network carrier are based on distinct and separate wireless networks that are communicably uncoupled from each other;
upon request from the first mobile device account, communicating with the first wireless network carrier to receive a first plurality of network data credits from the first wireless network carrier, wherein the first plurality of network data credits is based on network data credits allocated by the first wireless network carrier to the first mobile device account;
upon request from the second mobile device account, communicating with the second wireless network carrier to receive a second plurality of network data credits from the second wireless network carrier, wherein the second plurality of network data credits is based on network data credits allocated by the second wireless network carrier to the second mobile device account;
by one or more data share servers, creating a third-party shared data pool for including at least the first plurality of network data credits and a third plurality of network data credits, wherein the third plurality of network data credits is related neither to the first mobile device account nor the second mobile device account, said third plurality of network data credits being acquired from the first wireless network carrier or the second wireless network carrier;
by the one or more data share servers, upon request from the second mobile device account, allocating the first plurality of network data credits to the second mobile device account associated with the second wireless network carrier, and wherein the request from the second mobile device account is by executing a data share mobile application on the second mobile device, said data share mobile application further being configured to authorize dynamic changing of the Access Point Name (APN) for accessing the third-party shared data pool.

12. The method of claim 11, further comprising:
monitoring connection quality experienced by the first mobile device; and
upon exceeding a minimum quality threshold, providing network data credits to the first mobile device account, wherein the network data credits are allocated from a different carrier with an improved connection quality.

13. The method of claim 11, further comprising:
receiving from the first mobile device account, an indication of an amount of currency desired for the first plurality of network data credits; and
crediting the first mobile device account with currency in exchange for the first plurality of network data credits.

14. The method of claim 11, further comprising:
providing a third plurality of network data credits to a third mobile device account, wherein the third plurality of network data credits is a quantity required for access to a selected piece of content.

15. The method of claim 11, wherein the selected piece of content is one or more of a video, a digital voice file, a document, and an mp3 file.

16. The method of claim 11, wherein the first mobile device and the second mobile device are members of a social networking community, the method further comprising:
allocating the second plurality of network data credits to the first mobile device account associated with first wireless network carrier.

17. A non-transitory computer-readable medium encoded with a computer program, including instructions to cause a processor to perform:
causing storage of registration profiles for a plurality of mobile device accounts associated with a plurality of wireless network carriers, the plurality of mobile accounts including a first mobile device account associated with a first wireless network carrier and a second mobile device account associated with a second wireless network carrier, wherein the first wireless network carrier and the second wireless network carrier are based on distinct and separate wireless networks that are communicably uncoupled from each other:
upon request from the first mobile device account, communicating with the first wireless network carrier to receive a first plurality of network data credits from the first wireless network carrier, wherein the first plurality of network data credits is based on network data credits allocated by the first wireless network carrier to the first mobile device account;
upon request from the second mobile device account, communicating with the second wireless network carrier to receive a second plurality of network data credits from the second wireless network carrier, wherein the second plurality of network data credits is based on network data credits allocated by the second wireless network carrier to the second mobile device account;
by one or more data share servers, creating a third-party shared data pool for including at least the first plurality of network data credits and a third plurality of network data credits, wherein the third plurality of network data credits is related neither to the first mobile device account nor the second mobile device account, said third plurality of network data credits being acquired from the first wireless network carrier or the second wireless network carrier;
by the one or more data share servers, upon request from the second mobile device account, allocating the first plurality of network data credits to the second mobile device account associated with the second wireless network carrier, and wherein the request from the second mobile device account is by executing a data share mobile application on the second mobile device, said data share mobile application further being configured to authorize dynamic changing of the Access Point Name (APN) for accessing the third-party shared data pool.

18. The non-transitory computer-readable medium of claim 17, further comprising:
monitoring connection quality experienced by the first mobile device; and
upon exceeding a minimum quality threshold, providing network data credits to the first mobile device account, wherein the network data credits are allocated from a different carrier with an improved connection quality.

\* \* \* \* \*